US012706449B2

(12) United States Patent
Kameoka et al.

(10) Patent No.: US 12,706,449 B2
(45) Date of Patent: Aug. 11, 2026

(54) COMMUNICATION SYSTEM, MANAGEMENT DEVICE, AND NON-TRANSITORY COMPUTER READABLE STORAGE MEDIUM

(71) Applicant: DENSO CORPORATION, Kariya-city (JP)

(72) Inventors: Ryota Kameoka, Kariya-city (JP); Tomohisa Kishigami, Kariya-city (JP); Tomoya Tokunaga, Kariya-city (JP); Akira Tada, Kariya-city (JP); Yoji Homma, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 154 days.

(21) Appl. No.: 18/830,642

(22) Filed: Sep. 11, 2024

(65) Prior Publication Data

US 2025/0087986 A1 Mar. 13, 2025

(30) Foreign Application Priority Data

Sep. 13, 2023 (JP) ................................ 2023-148517
Apr. 3, 2024 (JP) ................................ 2024-060203
Aug. 13, 2024 (JP) ................................ 2024-134988

(51) Int. Cl.
*H02H 1/00* (2006.01)
*B60R 16/033* (2006.01)
(Continued)

(52) U.S. Cl.
CPC ......... *H02H 1/0061* (2013.01); *B60R 16/033* (2013.01); *H02H 7/20* (2013.01); *H04L 67/12* (2013.01)

(58) Field of Classification Search
CPC .......... H02H 1/0061; H02H 7/20; H02H 3/04; H02H 3/087; B60R 16/033; B60R 16/023; H04L 67/12; H04L 43/0805
(Continued)

(56) References Cited

U.S. PATENT DOCUMENTS 10,135,264 B2 * 11/2018 Horitake ................. H02J 7/977
11,930,021 B2 * 3/2024 Kishikawa .......... H04L 63/1466
(Continued)

FOREIGN PATENT DOCUMENTS

CN 114206680 A * 3/2022 ........... B60R 16/033
EP 3764601 B1 * 11/2021 ............. H04L 12/10
(Continued)

OTHER PUBLICATIONS

Tomoya Tokunaga: Title: In-Vehicle network system, management device; Entire specification and drawings. (Year: 2013).*

*Primary Examiner* — Dharti H Patel
(74) *Attorney, Agent, or Firm* — Harness, Dickey & Pierce, P.L.C.

(57) ABSTRACT

A communication system includes: a first control device receiving electric power supply from a power source via an electronic fuse; a second control device connected to the first control device for data communication; and a management device connected to the first and second control devices for data communication and controlling the electronic fuse. The management device performs at least one of: transmitting power source pre-cutoff notification information to the second control device notifying that the electric power supply will be cut off before turning off the electronic fuse; and transmitting power source post-cutoff notification information notifying that the electric power supply has been cut off after turning off the electronic fuse.

22 Claims, 15 Drawing Sheets

(51) Int. Cl.
*H02H 7/20* (2006.01)
*H04L 67/12* (2022.01)

(58) Field of Classification Search
USPC ............................................................ 361/64
See application file for complete search history.

(56) References Cited

U.S. PATENT DOCUMENTS

| | | | | |
|---|---|---|---|---|
| 2009/0015976 | A1* | 1/2009 | Hara | B60R 16/023 361/64 |
| 2012/0185120 | A1* | 7/2012 | Miyazaki | B60L 50/61 180/65.265 |
| 2015/0112510 | A1 | 4/2015 | Tokunaga et al. | |
| 2017/0144549 | A1* | 5/2017 | Park | B60L 3/04 |
| 2018/0208137 | A1* | 7/2018 | Yasunori | B60R 16/033 |
| 2018/0345816 | A1* | 12/2018 | Sakakibara | B60Q 9/00 |
| 2022/0063414 | A1* | 3/2022 | Kim | B60L 3/0092 |
| 2023/0061834 | A1* | 3/2023 | Shigemori | H02J 7/44 |
| 2024/0001871 | A1* | 1/2024 | Miyake | B60R 16/0231 |
| 2024/0275602 | A1* | 8/2024 | Moon | H04L 9/3226 |
| 2025/0231557 | A1* | 7/2025 | Matsumoto | B60R 16/03 |
| 2025/0238384 | A1* | 7/2025 | Ushiro | B60R 16/02 |

FOREIGN PATENT DOCUMENTS

| | | | | |
|---|---|---|---|---|
| JP | 2015-81021 | A | 4/2015 | |
| WO | WO-2020184513 | A1 * | 9/2020 | H02J 7/80 |

* cited by examiner

FIG. 1

DETERMINE TO ON
DETERMINE TO OFF
ELE FUSE 15
ON
OFF
CT1
DETERMINE TO ON
DETERMINE TO OFF
ELE FUSE 16
ON
OFF
CT2
ELE FUSE ST INF
15:ON 16:OFF
15:ON 16:ON
15:OFF 16:ON
15:OFF 16:OFF
COM DELAY
COM DELAY
SLAVE ECU 3 MON
ON
OFF
MT1
SLAVE ECU 4 MON
ON
OFF
MT2
t0
t1
t2
t3
t4
t5
t6
t7
t8
t9
t10
TIME

WHILE TRAVEL
ELE FUSE 15
WHILE PASSENGER IN VEH
ELE FUSE 16
ELE FUSE ST INF
SLAVE ECU 3 MON
SLAVE ECU 4 MON
ON
OFF
DETERMINE TO ON
DETERMINE TO OFF
CT1
CT2
MT1
MT2
15:OFF 16:ON
15:ON 16:ON
15:OFF 16:ON
15:OFF 16:OFF
COM DELAY
COM DELAY
t0
t1
t2
t3
t4
t5
t6
t7
t8
t9
t10
TIME

FIG. 11

| CONT TARGET | 1ST CLUSTER | 2ND CLUSTER | 3RD CLUSTER | 4TH CLUSTER | 5TH CLUSTER | 6TH CLUSTER | 7TH CLUSTER |
|---|---|---|---|---|---|---|---|
| ELE FUSE 15 (ECU 3) | ✓ | | ✓ | | | | |
| ECU 506 | | ✓ | | ✓ | | | |
| ELE FUSE 16 (ECU 4) | ✓ | | | | ✓ | | |
| ELE FUSE 504 (SENSOR 501) | | ✓ | | | | ✓ | |
| ELE FUSE 505 (ACT 502) | | ✓ | | | | | ✓ |

COMMUNICATION SYSTEM, MANAGEMENT DEVICE, AND NON-TRANSITORY COMPUTER READABLE STORAGE MEDIUM

CROSS REFERENCE TO RELATED APPLICATION

The present application claims the benefit of priority from Japanese Patent Applications No. 2023-148517 filed on Sep. 13, 2023, No. 2024-060203 filed on Apr. 3, 2024, and No. 2024-134988 filed on Aug. 13, 2024. The entire disclosure of the above application is incorporated herein by reference.

TECHNICAL FIELD

The present disclosure relates to a communication system including an electronic fuse, a management device, and a non-transitory computer readable storage medium.

BACKGROUND ART

A conceivable technique teaches an in-vehicle network system that includes a power source relay for switching individually on and off a power source of each of a plurality of electronic control devices, determines a control content for switching the power source of a specific electronic control device between an on state and an off state in the specific electronic control device corresponding to a scene which is determined based on a situation of the vehicle, and switches the on state and the off state of the power source to supply an electric power to the specific electronic control device using the power source relay.

SUMMARY OF INVENTION

According to an example, a communication system may include: a first control device receiving electric power supply from a power source via an electronic fuse; a second control device connected to the first control device for data communication; and a management device connected to the first and second control devices for data communication and controlling the electronic fuse. The management device performs at least one of: transmitting power source pre-cutoff notification information to the second control device notifying that the electric power supply will be cut off before turning off the electronic fuse; and transmitting power source post-cutoff notification information notifying that the electric power supply has been cut off after turning off the electronic fuse.

BRIEF DESCRIPTION OF THE DRAWINGS

The above and other objects, features and advantages of the present disclosure will become more apparent from the following detailed description made with reference to the accompanying drawings. In the drawings:

FIG. 1 is a block diagram illustrating the configuration of a communication system according to a first embodiment;

FIG. 11 is a diagram illustrating a correspondence relationship between a control target and a cluster;

DETAILED DESCRIPTION

Figure 2:
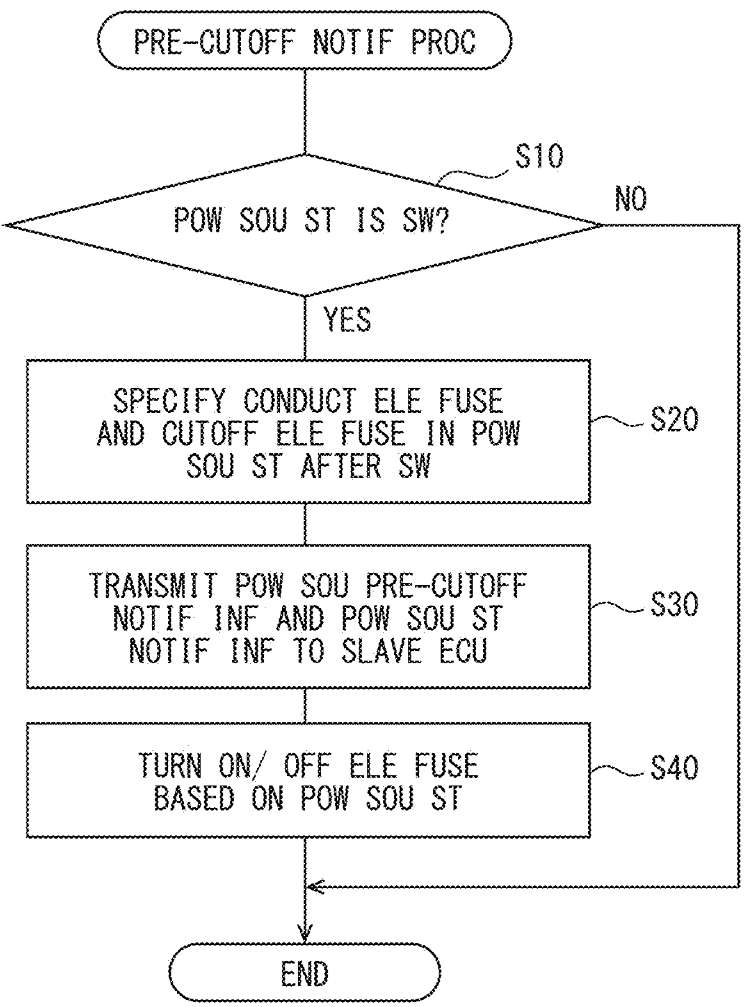
FIG. 2 is a flowchart showing a pre-cutoff notification process according to the first embodiment.

As a result of detailed study by the inventors, in a communication system that includes a plurality of electronic control devices and is configured to switch a power source of the plurality of electronic control devices using an electronic fuse, a difficulty is found such that an anomaly due to communication interruption may be erroneously detected and the detection accuracy of the anomaly may be decreased.

The present embodiments are to provide a communication system in which a detection accuracy of anomaly is improved.

One aspect of the present embodiments is a communication system including a first control device, a second control device, a switching control unit, and an electric power cutoff notification unit.

The first control device receives electric power supply from a power source via an electronic fuse.

The second control device is connected to the first control device so as to be able to perform data communication therebetween.

The switching control unit is configured to execute switching control for switching the electronic fuse between an on state and an off state.

The power cutoff notification unit is configured to execute at least one of a pre-cutoff notification process and a post-cutoff notification process. In the pre-cutoff notification process, power source pre-cutoff notification information is transmitted to the second control device to notify that the electronic power supply from the power source via the electronic fuse will be cut off before the electronic fuse is turned off to cut off the electronic power supply from the power source to the first control device. In the post-cutoff notification process, power source post-cutoff notification information is transmitted to the second control device to notify that the electronic power supply from the power source via the electronic fuse has been cut off after the electronic fuse is turned off to cut off the electronic power supply from the power source to the first control device.

The second control device is configured to store the received electric power pre-cutoff notification information and electric power post-cutoff notification information.

In the communication system of the present embodiments configured in this manner, when the switching control unit cuts off the electronic power supply to the first control device due to the electronic fuse being in the off state, the electric power source cutoff notification unit transmits at least one of the power source pre-cutoff notification information and the power source post-cutoff notification information to the second control device. In other words, the communication system of the present disclosure can determine whether or not the electronic fuse has been in the off state based on whether or not the second control device stores the power source pre-cutoff notification information and the power source post-cutoff notification information. Therefore, in the communication system of the present disclosure, even if the second control device detects an anomaly related to the first control device caused by the electronic fuse being in the off state, when the second control device stores the power source pre-cutoff notification information and the power source post-cutoff notification information, it can be determined that no anomaly has occurred in the first control device. In other words, the communication system of the present disclosure can suppress the occurrence of a situation in which it is determined that an anomaly has occurred in the first control device even though no anomaly has occurred in the first control device. Thereby, the communication system of the present disclosure can improve a detection accuracy of anomaly.

Another aspect of the present embodiments is a management device including an electronic fuse control unit, a communication unit, and a power source cutoff notification unit.

The electronic fuse control unit is configured to control the operation of an electronic fuse configured to switch between a conduction state in which a power supply path is conducted for supplying electric power from a power source to the first control device and a cutoff state in which the power supply path is cut off.

The communication unit is configured to perform data communication with a second control device that is connected to the first control device so as to be able to perform data communication with the first control device.

The management device of the present disclosure is a device provided in the communication system of the present disclosure, and can acquire similar effects as the communication system of the present disclosure.

Yet another aspect of the present embodiments is a management program for causing a computer to function as an electronic fuse control unit, a communication unit, and an electric power cutoff notification unit.

A computer controlled by the management program of the present disclosure can constitute a part of the management device of the present disclosure, and can obtain an effect similar to that of the center of the present disclosure.

First Embodiment

Hereinafter, a first embodiment according to the present disclosure will be described with reference to the drawings.

Figure 1:
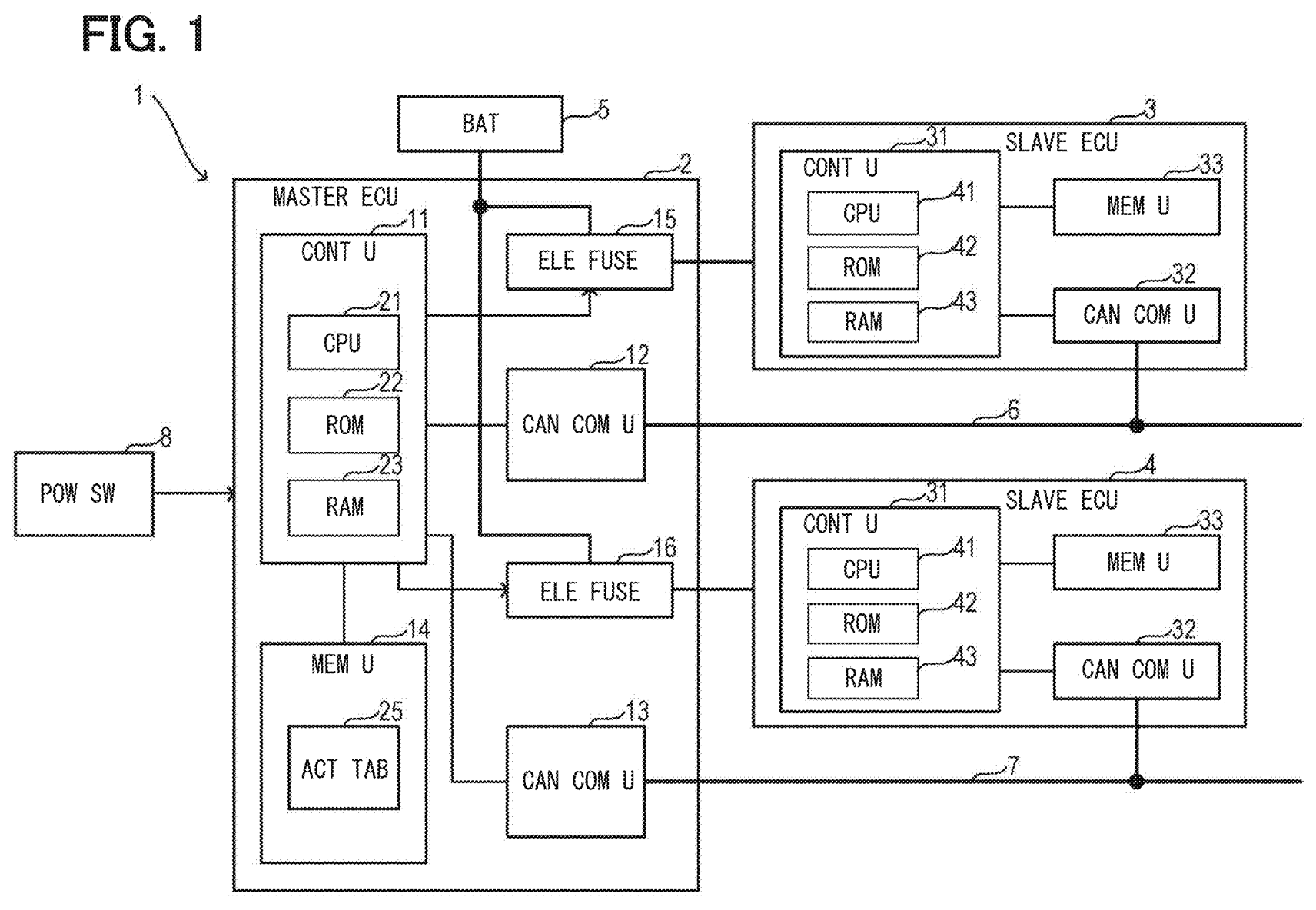

The communication system 1 of the present embodiment is mounted on a vehicle, and includes a master ECU 2, slave ECUs 3 and 4 and a battery 5, as shown in FIG. 1. ECU is an abbreviation for Electronic Control Unit. Hereinafter, the master ECU 2 and the slave ECUs 3 and 4 will be collectively referred to as nodes.

The master ECU 2 and the slave ECU 3 are connected to each other via a communication bus 6 so as to be capable of data communication.

The master ECU 2 and the slave ECU 4 are connected to each other via a communication bus 7 so as to be capable of data communication.

The battery 5 supplies electric power with various parts of the vehicle at a DC battery voltage (for example, 12V). The master ECU 2 and the slave ECUs 3 and 4 operate by receiving the electric power supply from the battery 5.

The master ECU 2 includes a control unit 11, CAN communication units 12 and 13, a storage unit 14, and electronic fuses 15 and 16. The CAN is an abbreviation for Controller Area Network.

The controller 11 is an electronic control unit mainly including a microcomputer with a CPU 21, a ROM 22, a RAM 23, and the like. Various functions of the microcomputer are implemented by the CPU 21 executing a program stored in a non-transitory tangible storage medium. In this example, the ROM 22 corresponds to the non-transitory tangible storage medium in which the program is stored. A method corresponding to the program is executed by executing the program. A part or all of the functions to be executed by the CPU 21 may be configured in hardware by one or multiple ICs or the like. The number of microcomputers included in the control unit 11 may be one or more.

The CAN communication unit 12 communicates with the slave ECU 3 connected to the communication bus 6 by transmitting and receiving a communication frame based on the CAN communication protocol.

The CAN communication unit 13 communicates with the slave ECU 4 connected to the communication bus 7 by transmitting and receiving a communication frame based on the CAN communication protocol. Hereinafter, the CAN communication frame will be referred to as a CAN frame.

The storage unit 14 is a storage device for storing various data. The storage unit 14 stores an activation table 25, which will be described later.

The electronic fuse 15 is arranged on the electric power supply path between the battery 5 and the slave ECU 3. The electronic fuse 16 is arranged on the electric power supply path between the battery 5 and the slave ECU 4.

The electronic fuses 15 and 16 include a switching element (for example, a MOSFET) and a control circuit. The control circuit for the electronic fuses 15 and 16 is configured to cut off the electric power supply path by switching the switching element from the on state to the off state when the current value flowing through the electric power supply path exceeds a preset overcurrent determination value.

The control circuits of the electronic fuses 15 and 16 are configured to conduct or cut off the electric power supply path by switching the switching element to be in the on state or the off state in accordance with a command from the control unit 11.

The slave ECUs 3 and 4 include control units 31, 41, CAN communication units 32, 42, and storage units 33, 43, respectively.

Each of the control unit 31 is an electronic control device mainly including a microcomputer with a CPU 41, a ROM 42, a RAM 43, and the like. Various functions of the microcomputer are implemented by the CPU 41 executing programs stored in a non-transitory tangible storage medium. In this example, the ROM 42 corresponds to the non-transitory tangible storage medium in which the programs are stored. A method corresponding to the program is executed by executing the program. Here, a part or all of the functions to be executed by the CPU 41 may be configured as hardware circuitry by one or multiple ICs or the like. Alternatively, the number of the microcomputers constituting the control unit 31 may be one or more.

The CAN communication unit 32 of the slave ECU 3 communicates with a communication device (that is, the master ECU 2) connected to the communication bus 6 based on a CAN communication protocol.

The CAN communication unit 32 of the slave ECU 4 communicates with a communication device (that is, the master ECU 2) connected to the communication bus 7 based on a CAN communication protocol.

The storage unit 33, 43 is a storage device for storing various data.

The communication system 1 is configured such that the slave ECU 3 and the slave ECU 4 can transmit and receive CAN frames to and from each other via the master ECU 2.

A power switch 8 is also provided inside the vehicle compartment. The power switch 8 is operated by the driver when starting the engine or the motor generator mounted in the vehicle, or when switching the power supply state of the vehicle. When the power switch 8 is pressed down, the power switch 8 outputs a power switch signal indicating that the power switch 8 has been pressed down.

When the driver presses down the power switch 8 while pressing the brake pedal of the vehicle, the engine or the motor generator starts.

In addition, each time the driver presses down the power switch 8 without pressing the brake pedal of the vehicle, the power source state of the vehicle is switched in the following order: a power off state, an accessory on state (hereinafter referred to as ACC on state), an ignition on state (hereinafter referred to as IG on state), a power off state, and so on.

In the activation table 25, a correspondence relationship is set between the power source state and an electronic fuse to be turned on (hereinafter, a conduction fuse) and an electronic fuse to be turned off (hereinafter, a cutoff fuse).

The activation table 25 is set so that, for example, when the power source state is the power off state, the electronic fuses 15 and 16 are the cutoff fuses.

The activation table 25 is set so that, for example, when the power source state is the ACC on state, the electronic fuse 16 is the conduction fuse and the electronic fuse 15 is the cutoff fuse.

The activation table 25 is set so that, for example, when the power source state is the IG on state, the electronic fuses 15 and 16 are the conduction fuses.

Next, the procedure of the pre-cutoff notification process executed by the control unit 11 of the master ECU 2 will be described. The pre-cutoff notification process is a process that is repeatedly executed while the master ECU 2 is activated.

When the pre-cutoff notification process is executed, the CPU 21 of the control unit 11 determines in S10 whether the power source state of the vehicle will be switched based on the input of the power switch signal from the power switch 8, as shown in FIG. 2. When the power source state of the vehicle is not switched, the CPU 21 ends the pre-cutoff notification process.

On the other hand, when the power source state of the vehicle is switched, the CPU 21 at S20 specifies the conduction fuse and the cutoff fuse in the power source state after switched based on the activation table 25.

In S30, the CPU 21 transmits the power source pre-cutoff notification information notifying that the electronic power supply from the battery 5 via the electronic fuse will be cut off and the power source state notification information notifying the power source state after switched, to the slave ECU connected to the conduction fuse. The power source pre-cutoff notification information includes cutoff fuse specification information that specifies the cutoff fuse.

The slave ECUs 3 and 4 store the electric power pre-cutoff notification information and the cutoff fuse specification information received from the master ECU 2 in the memory unit 33.

For example, when the cutoff fuse is the electronic fuse 15 and the conduction fuse is the electronic fuse 16, the CPU 21 transmits the power source pre-cutoff notification information and the power source state notification information to the slave ECU 4. The cutoff fuse specification information included in the power source pre-cutoff notification information indicates that the cutoff fuse is the electronic fuse 15.

In S40, the CPU 21 turns on the conduction fuse specified in S20 based on the power source state of the vehicle, turns off the cutoff fuse specified in S20, and ends the pre-cutoff notification process.

Figure 3:
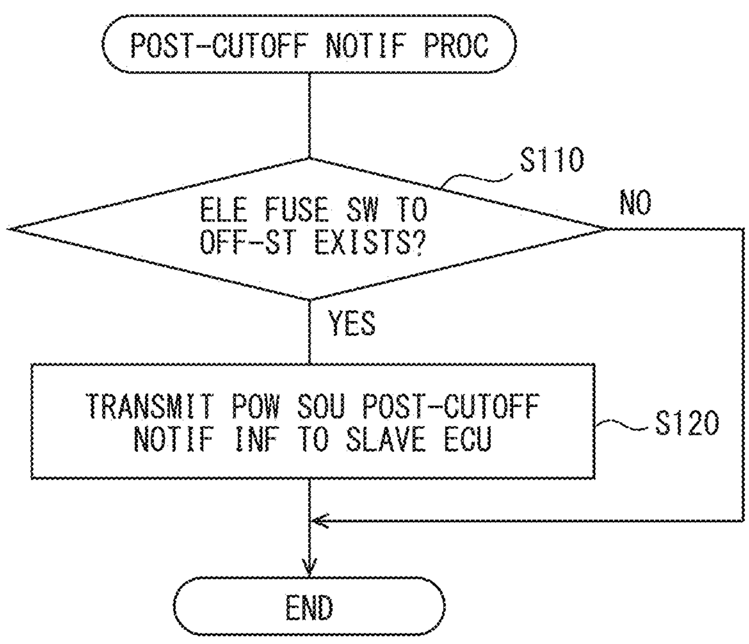
FIG. 3 is a flowchart showing a post-cutoff notification process.

Next, the procedure of the post-cutoff notification process executed by the control unit 11 of the master ECU 2 will be described. The post-cutoff notification process is a process that is repeatedly executed while the master ECU 2 is activated. When the post-cutoff notification process is executed, the CPU 21 of the control unit 11 determines in S110 whether or not the electronic fuse has spontaneously switched to the off state, as shown in FIG. 3. The electronic fuses 15, 16 are configured to output a turn-off notification signal to the master ECU 2 indicating that the electronic fuses 15, 16 have spontaneously switched to the off state when the current value flowing through the power source path exceeds an overcurrent determination value and the electronic fuses 15, 16 switch from the on state to the off state. Therefore, when the CPU 21 receives a off-state notification signal from the electronic fuses 15 and 16, the CPU 21 determines that the electronic fuses 15 and 16 have switched to the off state spontaneously.

If there is no electronic fuse that has spontaneously switched to the off state, the CPU 21 ends the post-cutoff notification process.

On the other hand, if there is an electronic fuse that has spontaneously switched to the off state, the CPU 21, at S120, transmits the power source post-cutoff notification information to the slave ECU connected to the conduction fuse to notify that the electronic power supply from the battery 5 via the electronic fuse has been cut off, and then ends the post-cutoff notification process. The power source post-cutoff notification information includes cutoff fuse specification information that specifies the cutoff fuse.

The slave ECUs 3 and 4 store the electric power post-cutoff notification information and the cutoff fuse specification information received from the master ECU 2 in the memory unit 33.

Next, the procedure of the interruption diagnosis invalidation process executed by the control units 31, 41 of the slave ECUs 3 and 4 will be described. The interruption diagnosis invalidation process is a process that is repeatedly executed while the slave ECUs 3 and 4 are activated.

Figure 4:
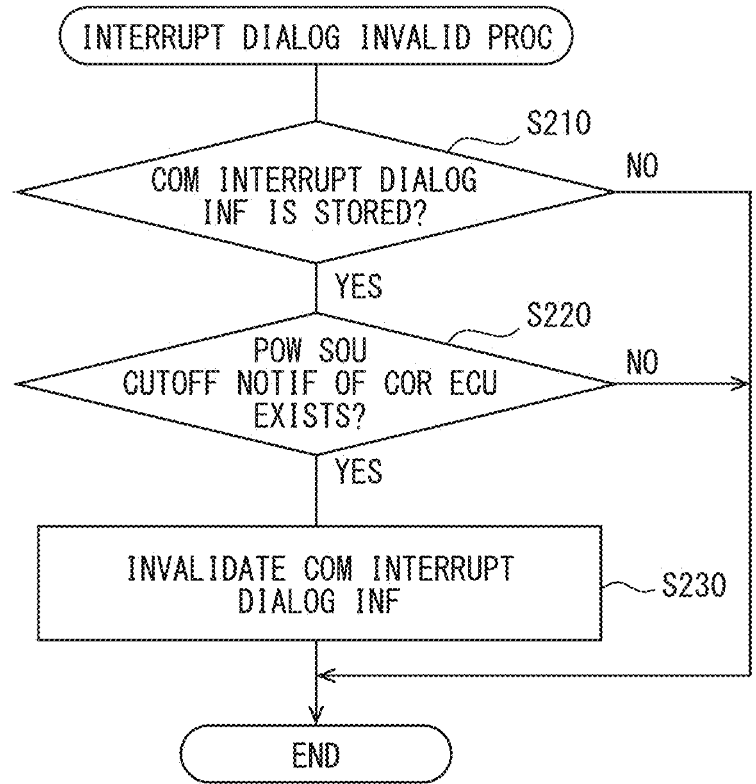
FIG. 4 is a flowchart showing a process of an interruption diagnosis invalidation process.

When the interruption diagnosis invalidation process is executed, the CPU 311, 411 of the control unit 31, 41 determines whether or not communication interruption diagnosis information of another node is stored in the storage unit 33 in S210 as shown in FIG. 4. The communication interruption diagnosis information of another node is information indicating that an anomaly in which the communication with another node has been interrupted has occurred.

If no communication interruption diagnosis information of another node is stored, the CPU 41 ends the interruption diagnosis invalidation process.

On the other hand, if the communication interruption diagnostic information of another node is stored, the CPU 41 determines in S220 whether or not the power source pre-cutoff notification information or the power source post-cutoff notification information including cutoff fuse specification information of an electronic fuse connected to another node corresponding to the stored communication interruption diagnostic information is stored.

If the power source pre-cutoff notification information or the power source post-cutoff notification information including the cutoff fuse specification information of the electronic fuse connected to another node is not stored, the CPU 41 ends the interruption diagnosis invalidation process.

On the other hand, if the power source pre-cutoff notification information or the power source post-cutoff notification information including the cutoff fuse specification information of the electronic fuse connected to another node is stored, at S230, the CPU 41 invalidates the communication interruption diagnosis information related to the slave ECU connected to the electronic fuse corresponding to the stored power source pre-cutoff notification information or the stored power source post-cutoff notification information, and ends the communication interruption diagnosis invalidation processing. For example, if the cutoff fuse specification information included in the power source pre-cutoff notification information or the power source post-cutoff notification information indicates the electronic fuse 15, the CPU 41 invalidates the communication interruption diagnosis information related to the slave ECU 3.

Specifically, for example, the communication interruption diagnosis information may be invalidated by adding invalidation information indicating that the communication interruption diagnosis information is invalid to the communication interruption diagnosis information. As a result, when the fault diagnosis device acquires the communication interruption diagnosis information from the slave ECUs 3 and 4 of the communication system 1, the fault diagnosis device can determine whether or not to invalidate the communication interruption diagnosis information based on whether or not the invalidation information has been added to the communication interruption diagnosis information.

The communication system 1 configured in this manner includes a slave ECU 3, a slave ECU 4, and a master ECU 2.

The slave ECU 3 receives an electric power supply from a battery 5 via an electronic fuse 15.

The slave ECU 4 is connected to the slave ECU 3 so as to be able to communicate data with each other.

The master ECU 2 is connected to the slave ECU 3 and the slave ECU 4 so as to be able to communicate data with each other, and is configured to control the operation of the electronic fuse 15.

The master ECU 2 is configured to perform at least one of a pre-cutoff notification process and a post-cutoff notification process. In the pre-cutoff notification process, the power source pre-cutoff notification information is transmitted to the slave ECU 4 to notify that the electric power supply from the battery 5 via the electronic fuse 15 will be cut off before the electronic fuse 15 is turned off to cut off the electric power supply from the battery 5 to the slave ECU 3. In the post-cutoff notification process, the power source post-cutoff notification information is transmitted to the slave ECU 4 to notify that the electric power supply from the battery 5 via the electronic fuse 15 has been cut off after the electronic fuse 15 is turned off to cut off the electric power supply from the battery 5 to the slave ECU 3.

In such a communication system 1, when the master ECU 2 cuts off the electric power supply to the slave ECU 3 due to the electronic fuse 15 being turned off, the master ECU 2 transmits at least one of the power source pre-cutoff notification information and the power source post-cutoff notification information to the slave ECU 4. In other words, the communication system 1 can determine whether or not the electronic fuse 15 has been in the off state based on whether or not the slave ECU 4 stores the power source pre-cutoff notification information and the power source post-cutoff notification information. Therefore, even if the slave ECU 4 detects an anomaly related to the slave ECU 3 caused by the electronic fuse 15 being turned off, the communication system 1 can determine that no anomaly has occurred in the slave ECU 3 when the slave ECU 4 stores the power source pre-cutoff notification information and the power source post-cutoff notification information. In other words, the communication system 1 can prevent the occurrence of a situation in which it is determined that an anomaly has occurred in the slave ECU 3 even if no anomaly has occurred in the slave ECU 3. Thereby, the communication system 1 can improve a detection accuracy of anomaly.

The power source pre-cutoff notification information and the power-source post-cutoff notification information include the cutoff fuse specification information for specifying the electronic fuse to be turned off. Thus, the communication system 1 causes the slave ECU 4 to recognize the slave ECU (i.e., the slave ECU 3) to which the electric power supply is to be cut off.

The slave ECU 4 is configured to invalidate the communication interruption diagnosis information indicating that the communication with the slave ECU 3 has been interrupted when the slave ECU 4 receives the power source pre-cutoff notification information or the power source post-cutoff notification information. As a result, even if the communication from the slave ECU 3 is interrupted due to the electronic fuse 15 being turned off, the communication system 1 can determine that no communication interruption anomaly has occurred in the slave ECU 3. In other words, the communication system 1 can prevent the occurrence of a situation in which it is determined that an anomaly of the communication interruption has occurred in the slave ECU 3 even if no anomaly has occurred in the slave ECU 3. Thereby, the communication system 1 can further improve a detection accuracy of anomaly.

The master ECU 2 is further configured to transmit the power source state notification information indicating the power source state after the change. Thus, the communication system 1 can cause the slave ECU 4 to recognize the power source state after the electronic fuse 15 is turned off. The slave ECU 4 that receives the power source state notification information can perform a process corresponding to the power source state indicated by the power source state notification information. For example, the slave ECU 4 receives the power source state notification information, and when the power source state indicated by the received power source state notification information is an off state of the power source, the slave ECU 4 performs a process of storing predetermined data in the storage unit 33.

In the embodiment described above, the slave ECU 3 corresponds to the first control device, the battery 5 corresponds to the power source, the slave ECU 4 corresponds to the second control device, the master ECU 2 corresponds to the switching unit and the management device, S30 and S120 correspond to the processing as a power source cutoff notification unit, and S220 and S230 correspond to the processing as an invalidation unit.

Second Embodiment

Hereinafter, a second embodiment of the present disclosure will be described with reference to the drawings. In the second embodiment, portions different from those of the first embodiment will be described. The same reference numerals are given to the same configurations.

The communication system 1 of the second embodiment differs from the first embodiment in that the configuration of the communication system 1 is changed, the pre-cutoff notification process is changed, the master ECU 2 does not perform the post-cutoff notification process, the slave ECUs 3 and 4 do not perform the interruption diagnosis invalidation process, and a monitoring management process is added.

Figure 5:
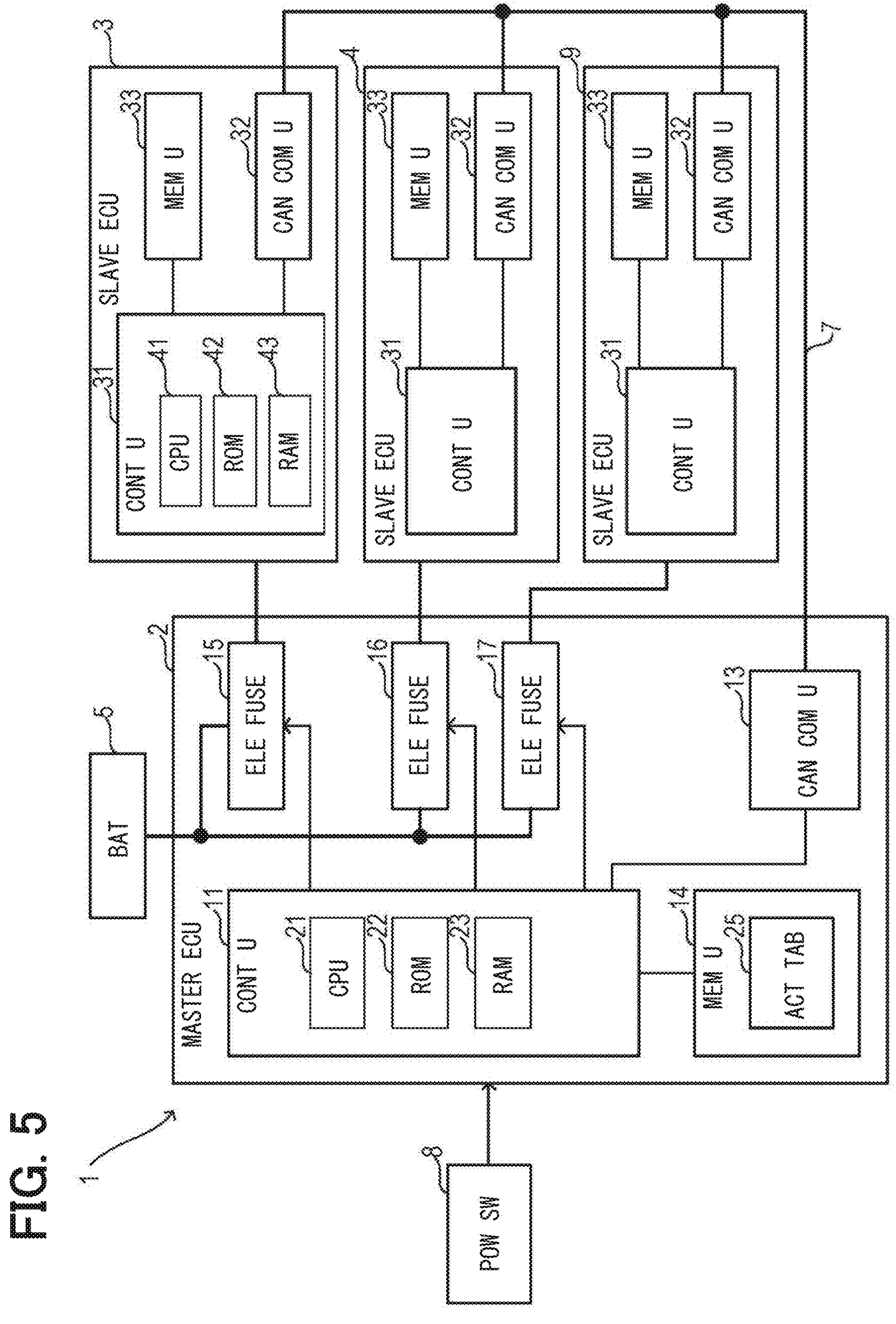
FIG. 5 is a block diagram illustrating the configuration of a communication system according to a second embodiment.

As shown in FIG. 5, the communication system 1 of the second embodiment differs from the first embodiment in that the configuration of the master ECU 2 is changed and a slave ECU 9 is added.

The master ECU 2 of the second embodiment differs from that of the first embodiment in that the CAN communication unit 12 is omitted and an electronic fuse 17 is added.

Like the slave ECUs 3 and 4, the slave ECU 9 includes a control unit 31, a CAN communication unit 32, and a storage unit 33.

The CAN communication unit 13 is connected to the CAN communication unit 32 of the slave ECUs 3, 4, and 9 via a communication bus 7, respectively.

The electronic fuse 17 is arranged on the electric power supply path between the battery 5 and the slave ECU 9. The control circuits of the electronic fuse 17 is configured to conduct or cut off the electric power supply path by switching the switching element to be in the on state or the off state in accordance with a command from the control unit 11.

Next, the procedure of the pre-cutoff notification process according to the second embodiment will be described.

Figure 6:
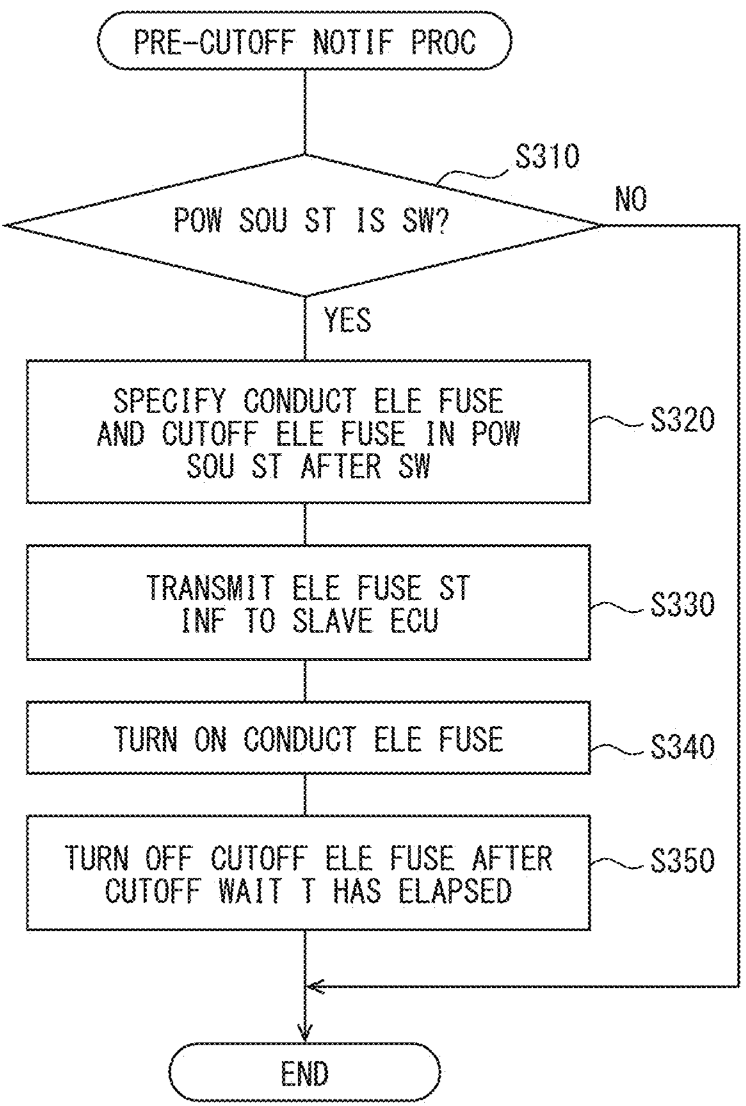
FIG. 6 is a flowchart showing a pre-cutoff notification process according to a second embodiment.

When the pre-cutoff notification process according to the second embodiment is executed, the CPU 21 of the control unit 11 determines in S310 whether the power source state of the vehicle will be switched based on the input of the power switch signal from the power switch 8, as shown in FIG. 6. When the power source state of the vehicle is not switched, the CPU 21 ends the pre-cutoff notification process.

On the other hand, when the power source state of the vehicle is switched, the CPU 21 at S320 determines, based on the activation table 25, whether each of the electronic fuses 15, 16, 17 is a conduction fuse or a cutoff fuse in the power source state after being switched.

In step S330, the CPU 21 transmits the fuse state information to the slave ECUs 3, 4, and 9. The fuse state information indicates whether each of the electronic fuses 15, 16, and 17 is a conduction fuse or a cutoff fuse.

In step S340, the CPU 21 turns on the conduction fuse specified in step S320. For example, when the CPU 21 determines in S320 that the electronic fuse 15 is a conduction fuse, the CPU 21 sets the electronic fuse 15 to an on state.

In S350, the CPU 21 turns off the cutoff fuse specified in S320 after a predetermined cutoff waiting time has elapsed since transmitting the fuse state information in S330, and ends the pre-cutoff notification process. The cutoff waiting time may be the same for all the electronic fuses 15 to 17, or different values set for each of the electronic fuses 15 to 17 depending on the slave ECUs 3, 4, and 9 connected to the electronic fuses 15, 16, and 17. The cutoff waiting time is set to be greater than the maximum estimation communication delay time.

Next, the procedure of the monitoring management process performed by the control units 31, 41, 91 of the slave ECUs 3, 4, and 9 will be described. The monitoring management process is repeatedly performed while the slave ECUs 3, 4, and 5 are activated.

Figure 7:
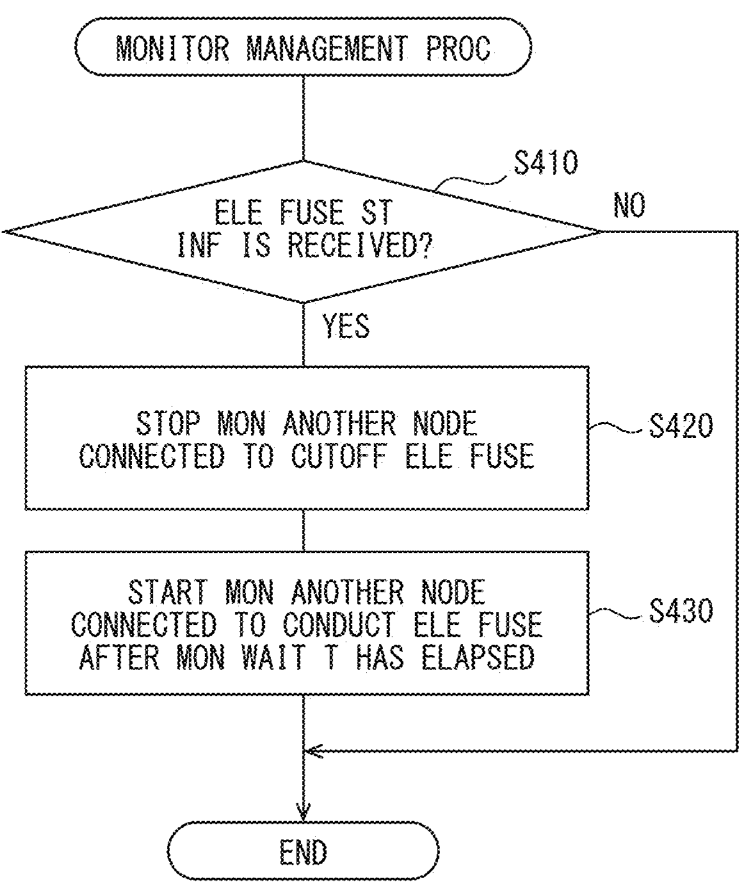
FIG. 7 is a flowchart of a monitoring management process.

When the monitoring management process is performed, each of the CPUs 31, 41, 91 of the control units 31, 41, 91 determines whether or not the fuse state information has been received from the master ECU 2 in S410, as shown in FIG. 7. When no fuse state information has been received, each of the CPUs 31, 41, 91 ends the monitoring management process.

On the other hand, when fuse state information has been received, each of the CPUs 31, 41, 91 stops, in S420, monitoring for the communication interruption to monitor whether or not the communication has been interrupted for another node connected to the cutoff fuse indicated in the fuse state information.

In the communication interruption monitoring, when a CAN frame to be transmitted from another node is not transmitted for longer than a predetermined anomaly determination time, each of the CPUs 31, 41, 91 stores the communication interruption diagnosis information indicating that a communication interruption anomaly has occurred in another node. The anomaly determination time is set to a time longer than the frame transmission period in which another node transmits the CAN frame.

In S430, each of the CPUs 31, 41, 91 starts the above-described communication interruption monitoring for another node connected to the conduction fuse indicated by the fuse state information after the monitoring wait time predetermined for another node has elapsed, and ends the monitoring management process. The monitoring wait time is set to be longer than the time required for the corresponding another node to be activated and become a communication capable state.

Next, a specific example of starting and stopping the communication interruption monitoring will be described.

Figure 8:
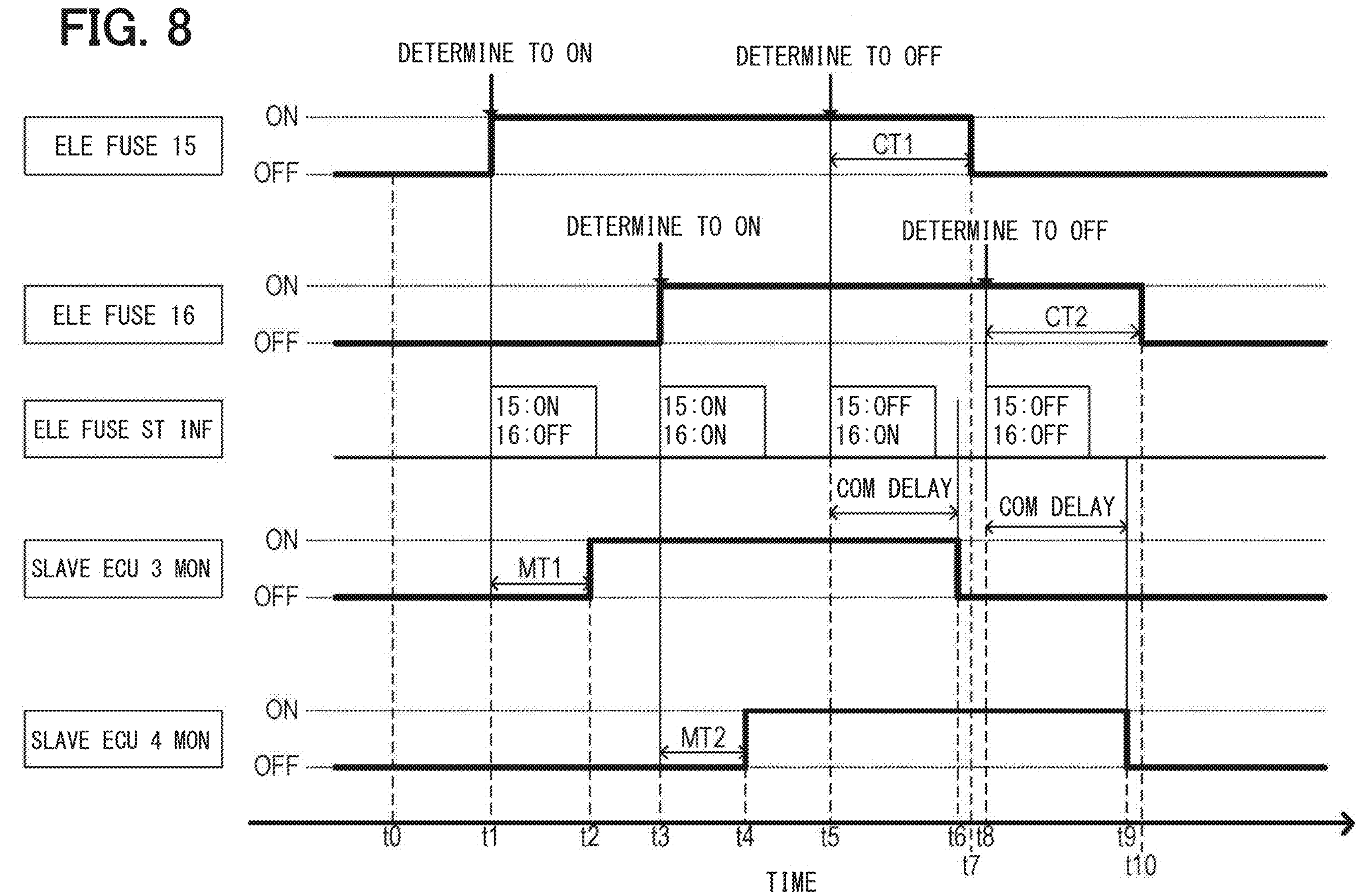
FIG. 8 is a timing chart showing a specific example of the start and the end of monitoring in the second embodiment.

As shown in FIG. 8, at time to, the electronic fuses 15 and 16 are in the off state, and the slave ECU 9 is not monitoring the slave ECUs 3 and 4 for the communication interruption.

At time t1, the master ECU 2 turns the electronic fuse 15 on. The master ECU 2 also transmits the fuse state information indicating that the electronic fuse 15 is a conduction fuse and that the electronic fuse 16 is a cutoff fuse.

The slave ECU 9 starts monitoring for a communication interruption of the slave ECU 3 at time t2 when the monitoring wait time MT1 has elapsed since receiving the fuse state information. The monitoring wait time MT1 is set to be longer than the time required for the slave ECU 3 to be activated and become a communication capable state.

At time t3, the master ECU 2 turns the electronic fuse 16 on. The master ECU 2 also transmits the fuse state information indicating that the electronic fuses 15 and 16 are conduction fuses.

The slave ECU 9 starts monitoring for a communication interruption of the slave ECU 4 at time t4 when the monitoring wait time MT2 has elapsed since receiving the fuse state information. The monitoring wait time MT2 is set to be longer than the time required for the slave ECU 4 to be activated and become a communication capable state.

At time t5, the master ECU 2 determines to turn off the electronic fuse 15. The master ECU 2 also transmits the fuse state information indicating that the electronic fuse 15 is a cutoff fuse and that the electronic fuse 16 is a conduction fuse.

When the slave ECU 9 receives the fuse state information at time t6, the slave ECU 9 stops monitoring the slave ECU 3 for the communication interruption.

The master ECU 2 turns off the electronic fuse 15 at time t7 when the cutoff waiting time CT1 has elapsed from time t5.

At time t8, the master ECU 2 determines to turn off the electronic fuse 16. The master ECU 2 also transmits the fuse state information indicating that the electronic fuses 15 and 16 are cutoff fuses.

When the slave ECU 9 receives the fuse state information at time t9, the slave ECU 9 stops monitoring the slave ECU 4 for the communication interruption.

The master ECU 2 turns off the electronic fuse 16 at time t10 when the cutoff waiting time CT2 has elapsed from time t8.

In the communication system 1 configured in this manner, the master ECU 2 transmits the fuse state information to the slave ECU 4 notifying that the electronic fuse 15 will be turned off before turning off the electronic fuse 15 to cut off the electric power supply from the battery 5 to the slave ECU 3. The master ECU 2 is further configured to turn off the electronic fuse 15 after a predetermined cutoff waiting time has elapsed since the master ECU 2 transmitted the fuse state information.

In such a communication system 1, the master ECU 2 turns off the electronic fuse 15 after the cutoff waiting time has elapsed since transmitting the fuse state information to the slave ECU 4. Therefore, even if a communication delay occurs and the reception of the fuse status information at the slave ECU 4 is delayed, the communication system 1 can prevent the electronic fuse 15 from being turned off before the ECU 4 receives the fuse status information. In other words, the communication system 1 can prevent the occurrence of a situation in which it is determined that an anomaly of the communication interruption has occurred in the slave ECU 3 even if no anomaly of the communication interruption has occurred in the slave ECU 3. Thereby, the communication system 1 can improve a detection accuracy of anomaly.

Furthermore, the slave ECU 4 is configured to stop monitoring the communication interruption of the slave ECU 3 when the slave ECU 4 receives the fuse state information notifying the electronic fuse 15 to be turned off. In such a communication system 1, the slave ECU 4 quickly stops monitoring the slave ECU 3 for the communication interruption, thereby further preventing the occurrence of a situation in which it is determined that an anomaly of the communication interruption has occurred in the slave ECU 3 even if no anomaly of the communication interruption has occurred in the slave ECU 3.

Furthermore, the master ECU 2 is configured to transmit the fuse state information to the slave ECU 4 notifying that the electronic fuse 15 is to be turned on before the master ECU 2 turns on the electronic fuse 15. The slave ECU 4 is configured to start monitoring the slave ECU 3 after a predetermined monitoring wait time has elapsed since receiving the fuse state information. In such a communication system 1, the slave ECU 4 can start monitoring the slave ECU 3 after the electronic fuse 15 is in the on state and the slave ECU 3 is activated and becomes the communication capable state. Thus, the communication system 1 can further prevent the occurrence of a situation in which it is determined that an anomaly of the communication interruption has occurred in the slave ECU 3 even if no anomaly of the communication interruption has occurred in the slave ECU 3.

In the embodiment described above, S330 corresponds to processing as a power source cutoff notification unit, the fuse status information corresponds to power source pre-cutoff notification information and the power source conduction notification information, S350 corresponds to processing as a cutoff unit, and S420 corresponds to processing as a monitoring stop unit.

Third Embodiment

Hereinafter, a third embodiment of the present disclosure will be described with reference to the drawings. In the third embodiment, portions different from those of the first embodiment will be described. The same reference numerals are given to the same configurations.

Figure 10:
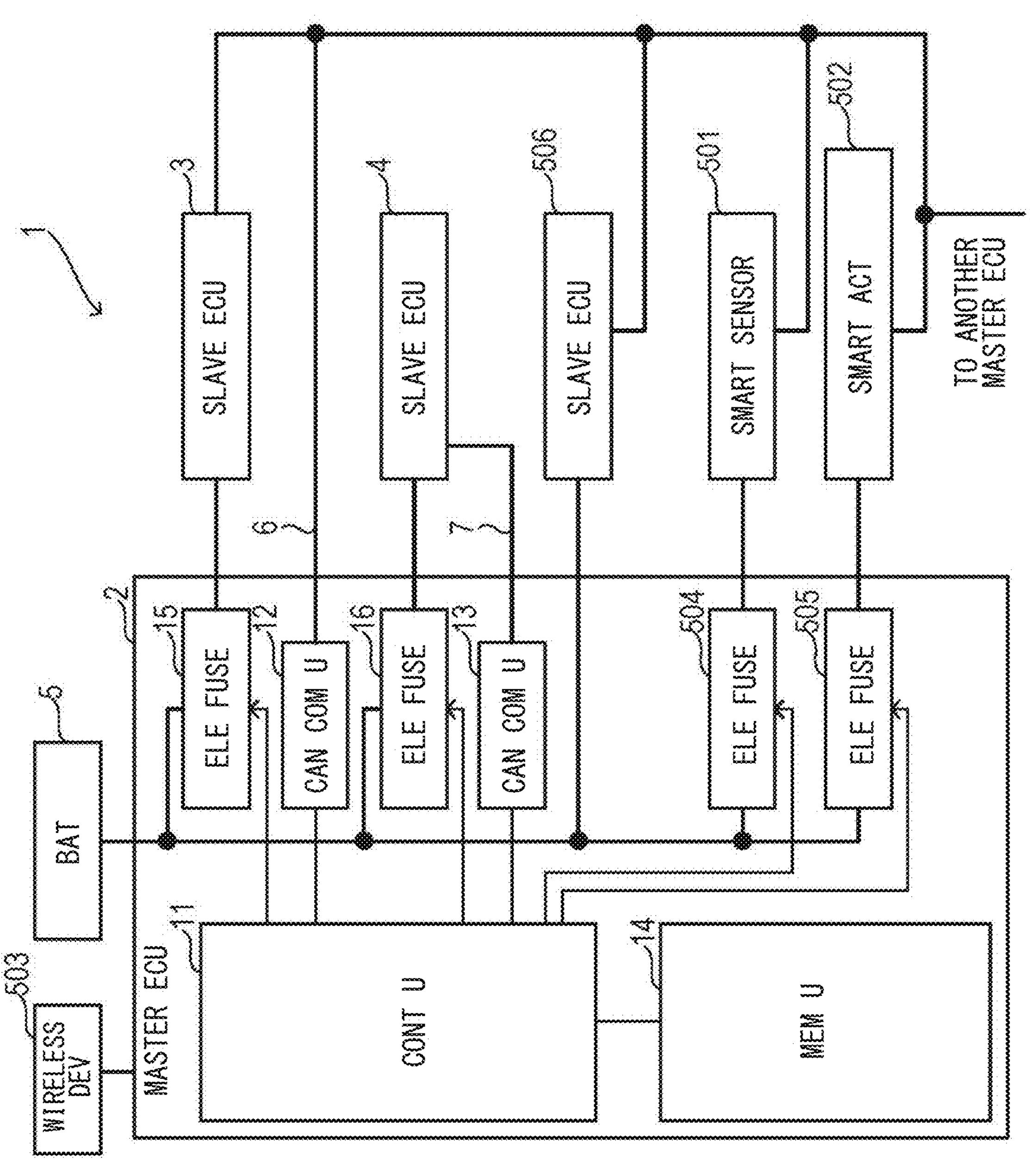
FIG. 10 is a block diagram illustrating the configuration of a communication system according to a third embodiment.

As shown in FIG. 10, the communication system 1 of the third embodiment differs from the first embodiment in that a smart sensor 501, a smart actuator 502, a wireless device 503, electronic fuses 504 and 505, and a slave ECU 506 are added.

The smart sensor 501 is a sensor equipped with a communication function. The smart sensor 501 is connected to the communication bus 6.

The smart actuator 502 is an actuator equipped with a communication function. The smart actuator 502 is connected to the communication bus 6.

The wireless device 503 is a wireless communication device for performing wireless communication with an external communication device installed outside the vehicle. The wireless device 503 is, for example, a DCM. DCM stands for Data Communication Module.

The electronic fuse 504 is disposed on the power supply path between the battery 5 and the smart sensor 501. The electronic fuse 505 is disposed on the power supply path between the battery 5 and the smart actuator 502.

Each of the electronic fuses 504 and 505 is configured to switch, in response to an instruction from the control unit 11, between a conduction state in which the power supply path is connected and a cut-off state in which the power supply path is cut off.

Hereinafter, the master ECU 2, the slave ECUs 3 to 5, the smart sensor 501, the smart actuator 502 and the slave ECU 506 will be collectively referred to as nodes.

(Prerequisite)

The master ECU 2 and the slave ECU 506 are always supplied the electric power by the battery 5 without passing through an electronic fuse, and can independently switch between a wake-up state and a sleep state by themselves. Hereinafter, the master ECU 2 and the slave ECU 506 are also referred to as NM-equipped nodes. An NM-equipped node is a node having a function of generating an NM frame.

The slave ECUs 3 and 4, the smart sensor 501, and the smart actuator 502 are supplied with the electric power via an electronic fuse, and cannot independently switch to a wake-up state or a sleep state by themselves. That is, they become the wake-up state occurs when the electronic fuse is turned on, and they become the sleep state when the electronic fuse is turned off. Hereinafter, the slave ECU 3, the slave ECU 4, the smart sensor 501, and the smart actuator

502 are also referred to as non-NM nodes. The non-NM node is a node that does not have the function to generate and interpret a NM frame.

The non-NM node includes at least one of an actuator and a sensor in addition to an ECU having a control function.

The power supply paths of the non-NM nodes are connected to the electronic fuses 15, 16, 504, and 505 of the master ECU 2, respectively.

The non-NM nodes and the electronic fuses may be connected one-to-one, or multiple non-NM nodes belonging to the same cluster (i.e., a group that is activated simultaneously) may be connected in control of one electronic fuse.

The master ECU 2 and the NM-equipped node have a CAN communication unit and are capable of transmitting and receiving a NM frame.

The NM-equipped node determines whether the node is in a wake-up state or a sleep state based on an NM frame transmitted and received via a communication bus.

The master ECU 2 turns on or off the electronic fuses 15, 16, 504, and 505 to which the non-NM node is connected, based on the NM frame transmitted and received via the communication bus.

The payload (i.e., data area) of an NM frame transmitted and received by the master ECU 2 and the NM-equipped node stores one or more bits of information indicating which cluster to activate.

One or more master ECUs (i.e., ECUs with built-in electronic fuses) are mounted in a vehicle.

As shown in FIG. 11, one or more nodes belonging to each cluster are determined in advance by the system developer. Although it is possible to assign a cluster to each node, multiple nodes can be assigned to one cluster. If the bit corresponding to each cluster is active (i.e., "bit"=1), the cluster wakes up. In the case of the master ECU, waking up indicates an on state of the electronic fuse.

First Activation Example

The first activation example is an operation example in which a fault diagnosis of the slave ECU 3 is performed in response to a request from the cloud.

First, a connection request is transmitted from the base station (i.e., the cloud) to the wireless device 503 of the vehicle.

Next, when the wireless device 503 determines that the connection request is proper, the wireless device 503 notifies the master ECU 2 of the event received from the cloud.

Next, the master ECU 2 determines a service defined as "fault diagnosis of the slave ECU 3" based on the event, and generates an NM frame in which the bit of the third cluster to which only the slave ECU 3 belongs is active in order to activate the slave ECU 3.

Next, the master ECU 2 transmits the generated NM frame onto the communication buses 6 and 7.

Since there is no NM-equipped node belonging to the third cluster on the communication buses 6 and 7, there is no change in the devices on the communication buses.

Next, the master ECU 2 executes processing based on the NM frame in the control unit 11, assuming that the master ECU has received an NM frame in which the bit of the third cluster is active at the same time as the above.

Next, the control unit 11 of the master ECU 2 determines a wake-up instruction to the third cluster, and since the third cluster includes the electronic fuse 15, turns on the electronic fuse 15.

When the electronic fuse 15 is in the on state, the electric power is supplied to the downstream slave ECU 3 and the slave ECU 3 is activated.

The master ECU 2 waits for the slave ECU 3 to be activated, requests the slave ECU 3 for a diagnosis code, and transmits a response result from the slave ECU 3 to the base station via the wireless device 503.

Second Activation Example

The second activation example is an operation example in which a fault diagnosis of the slave ECU 506 is performed in response to a request from the cloud.

First, a connection request is transmitted from the base station (i.e., the cloud) to the wireless device 503 of the vehicle.

Next, when the wireless device 503 determines that the connection request is proper, the wireless device 503 notifies the master ECU 2 of the event received from the cloud.

Next, the master ECU 2 determines a service defined as "fault diagnosis of the slave ECU 506" based on the event, and generates an NM frame in which the bit of the fourth cluster to which only the slave ECU 506 belongs is active in order to activate the slave ECU 506.

Next, the master ECU 2 transmits the generated NM frame onto the communication buses 6 and 7.

Since the slave ECU 506 is disposed on the communication bus 6 as a node belonging to the fourth cluster, the slave ECU 506 wakes up.

Next, the master ECU 2 executes processing based on the NM frame in the control unit 11, assuming that the master ECU has received an NM frame in which the bit of the fourth cluster is active at the same time as the above.

Next, even if the control unit 11 of the master ECU 2 determines to issue a wake-up instruction to the fourth cluster based on the NM frame, the fourth cluster does not include the corresponding electronic fuse, so the control unit 11 ignores the instruction.

When the slave ECU 506 is activated, the master ECU 2 requests the slave ECU 506 for a diagnostic code via the communication bus, and transmits a response result from the slave ECU 506 to the base station via the wireless device 503.

Third Activation Example

The third activation example is an operation example in which a user activates remote air conditioning using a smartphone.

First, the user issues an instruction to turn on the in-vehicle air conditioner via the smartphone.

When the wireless device 503 receives an instruction signal from the smartphone and determines that the instruction signal is proper, the wireless device 503 transmits the event (i.e., the instruction signal) received from the cloud to the master ECU 2.

The master ECU 2 determines the "air conditioning service" based on the event, and generates an NM frame in which the second cluster is activated as the air conditioning cluster.

The master ECU 2 periodically transmits the generated NM frame to the communication buses 6 and 7 until an instruction to stop the air conditioner is received. If the user requests to continue the active state, it is necessary for the master ECU 2 to continue transmitting the NM frames periodically. At the same time, the control unit 11 of the master ECU 2 executes a process based on the NM frame.

When an NM frame that activates the second cluster occurs on the communication bus 6, the slave ECU 506 (i.e., the air conditioner ECU) belonging to the second cluster receives the NM frame and wakes up in accordance with the received NM frame.

When the control unit 11 of the master ECU 2 detects that the second cluster is active, the master ECU 2 turns on the electronic fuses 504 and 505 that belong to the second cluster.

When electronic fuse 504 and the electronic fuse 505 are in the on state, the electric power is supplied to the smart sensor 501 (i.e., the temperature sensor) and the smart actuator 502 (i.e., the compressor).

As a result of the above, the electric power supply to the air conditioner ECU, the smart sensor 501, and the smart actuator 502 starts, so that it is possible to turn on the in-vehicle air conditioner.

When the user issues an instruction to turn off the in-vehicle air conditioner from the smartphone, the master ECU 2 stops the periodic transmission of the NM frame.

When the NM frame is interrupted, the slave ECU 506 transitions to a sleep state, and the master ECU 2 turns off the electronic fuses 504 and 505. Thus, the in-vehicle air conditioner stops operating.

Fourth Activation Example

The fourth activation example is an operation example in which the slave ECU 506 activates the in-vehicle air conditioner.

Since the slave ECU 506 is always supplied with the electric power even when the vehicle is stopped, it is possible for the slave ECU 506 to wake up when the slave ECU 506 detects the input of a signal indicating that the activation switch connected to the slave ECU 5 has been turned on, even when the slave ECU 5 is in a sleep state.

When the woken up slave ECU 506 confirms an input to activate the in-vehicle air conditioner, the slave ECU 5 generates an NM frame with the bit corresponding to the second cluster turned on.

The slave ECU 506 transmits the generated NM frame via the CAN communication unit 32. When the master ECU 2 receives this NM frame, the master ECU 2 turns on the electronic fuses 504 and 505 that belong to the second cluster.

When the activation switch of the in-vehicle air conditioner is turned off, the slave ECU 506 stops transmitting the NM frame and transitions to a sleep state after a while.

When the NM frame is interrupted, the master ECU 2 turns off the electronic fuses 504 and 505 after a while and ends the control.

When the master ECU 2 determines that it is necessary to continue the control even after the transmission of the NM frame has stopped, the master ECU 2 transmits an NM frame in which the bit corresponding to the second cluster is set to be on. This also allows the slave ECU 506, the smart sensor 501 and the smart actuator 502 to maintain the activation until the transmission of the NM frame generated by the master ECU 2 stops.

Fourth Embodiment

Hereinafter, a fourth embodiment according to the present disclosure will be described with reference to the drawings.

Figure 12:
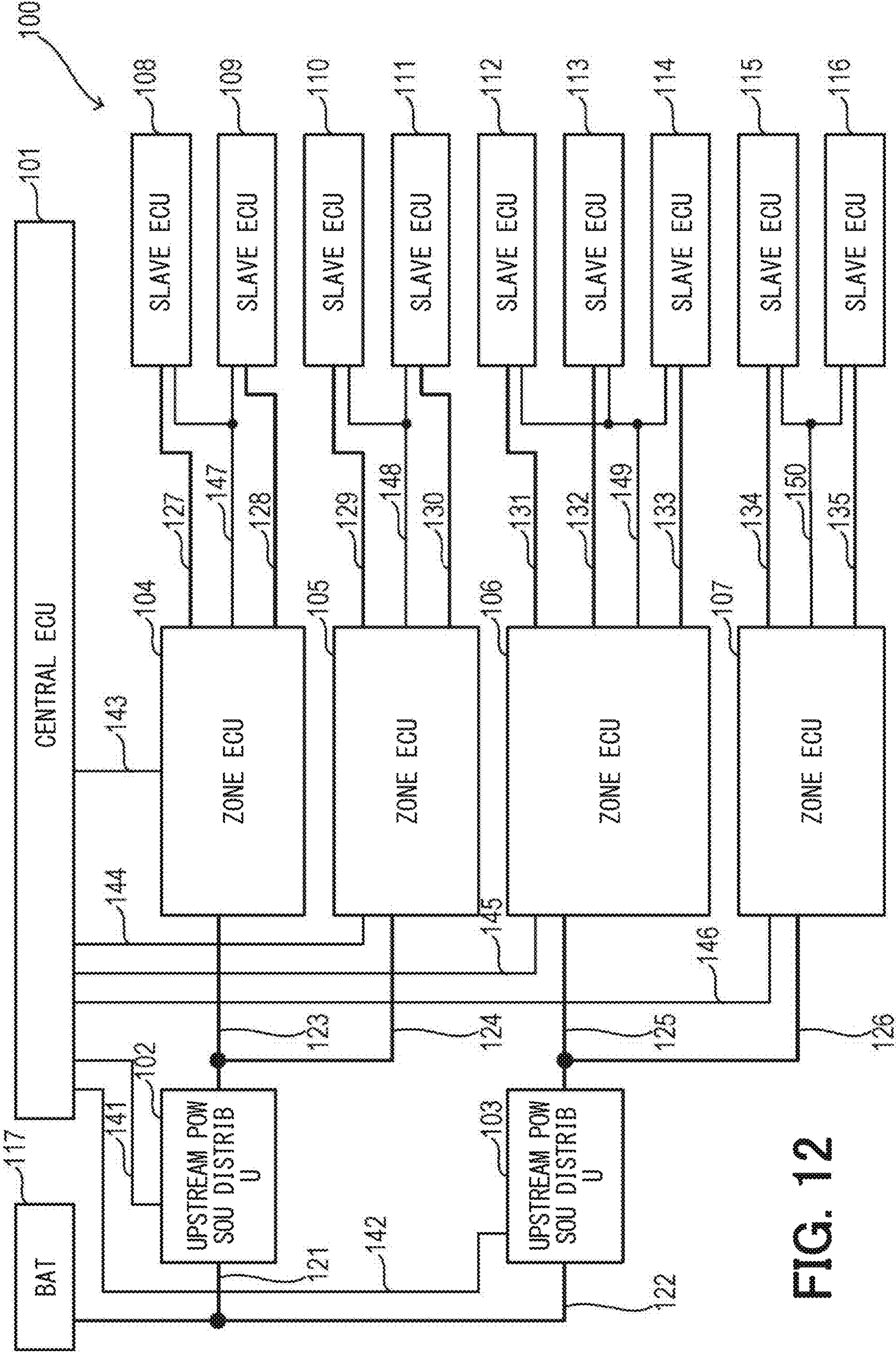
FIG. 12 is a block diagram illustrating the configuration of a communication system according to a fourth embodiment.

The communication system 100 of the fourth embodiment is mounted on a vehicle and, as shown in FIG. 12, includes a central ECU 101, upstream electric power distribution units 102, 103, zone ECUs 104, 105, 106, 107, slave ECUs 108, 109, 110, 111, 112, 113, 114, 115, 116, and a battery 117. In the following description, the central ECU 101, the zone ECUs 104 to 107, and the slave ECUs 108 to 116 are collectively referred to as nodes.

The battery 117 supplies electric power to various parts of the vehicle at a DC battery voltage (for example, 12V). The central ECU 101, the upstream electric power distribution units 102 and 103, the zone ECUs 104 to 107, and the slave ECUs 108 to 116 operate by receiving the electric power supply from a battery 117.

The upstream electric power supply distribution unit 102 receives the electric power supply from the battery 117 via a power supply path 121 between the battery 117 and the upstream electric power supply distribution unit 102.

The upstream electric power supply distribution unit 103 receives the electric power supply from the battery 117 via a power supply path 122 between the battery 117 and the upstream electric power supply distribution unit 103.

The zone ECUs 104 and 105 receive the electric power from a battery 117 via power supply paths 123 and 124 between the upstream electric power distribution unit 102 and the zone ECUs 104 and 105, respectively.

The zone ECUs 106 and 107 receive the electric power from the battery 117 via the power supply paths 125 and 126 between the upstream electric power distribution unit 103 and the zone ECUs 106 and 107, respectively.

The slave ECUs 108 and 109 receive the electric power from the battery 117 via the power supply paths 127 and 128 between the zone ECU 104 and the slave ECUs 108 and 109, respectively.

The slave ECUs 110 and 111 receive the electric power from a battery 117 via the power supply paths 129 and 130 between the zone ECU 105 and the slave ECUs 110 and 111, respectively.

The slave ECUs 112, 113 and 114 receive the electric power from the battery 117 via the power supply paths 131, 132 and 133 between the zone ECU 106 and the slave ECUs 112, 113 and 114, respectively.

The slave ECUs 115 and 116 receive the electric power from a battery 117 via the power supply paths 134 and 135 between the zone ECU 107 and the slave ECUs 115 and 116, respectively.

The central ECU 101 and the upstream electric power distribution unit 102 are connected to each other via a communication line 141 so as to be able to communicate data with each other.

The central ECU 101 and the upstream electric power distribution unit 103 are connected to each other via a communication line 142 so as to be able to communicate data with each other.

The central ECU 101 and the zone ECUs 104, 105, 106, and 107 are connected to each other via communication lines 143, 144, 145, and 146, respectively, so as to be able to communicate data with each other.

The zone ECU 104 and the slave ECUs 108 and 109 are connected to each other via a communication bus 147 so as to be capable of data communication.

The zone ECU 105 and the slave ECUs 110, 111 are connected to each other via a communication bus 148 so as to be capable of data communication.

The zone ECU 106 and the slave ECUs 112, 113 and 114 are connected to each other via a communication bus 149 so as to be capable of data communication.

The zone ECU 107 and the slave ECUs 115, 116 are connected to each other via a communication bus 150 so as to be capable of data communication.

Figure 13:
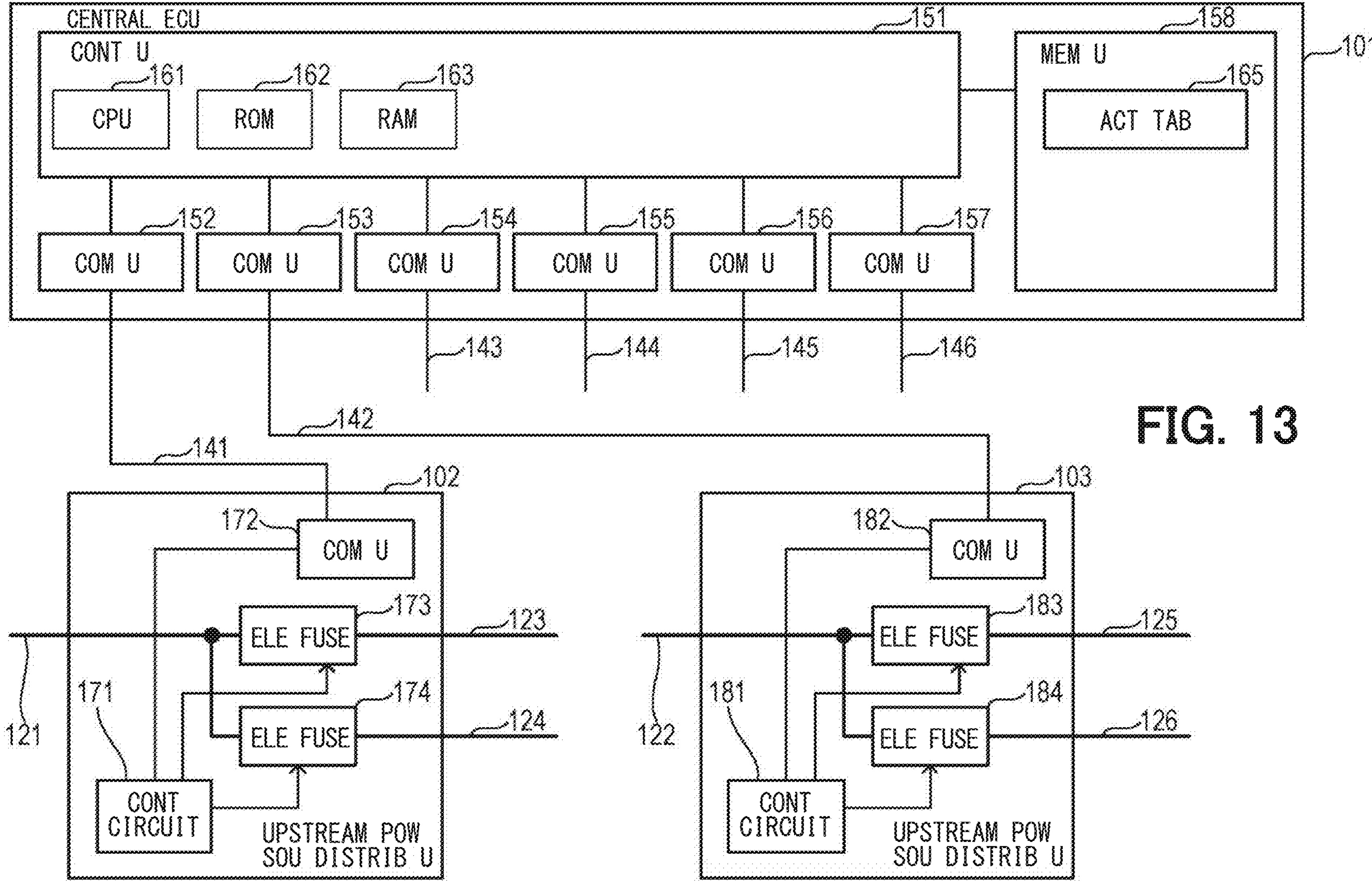
FIG. 13 is a block diagram showing the configuration of a central ECU and an upstream electric power distribution unit according to the fourth embodiment.

As shown in FIG. 13, the central ECU 101 includes a control unit 151, communication units 152, 153, 154, 155, 156, and 157, and a memory unit 158.

The control unit 151 is an electronic control device mainly including a microcomputer with a CPU 161, a ROM 162, a RAM 163, and the like. Various functions of the microcomputer are implemented by the CPU 161 executing programs stored in a non-transitory tangible storage medium. In this example, the ROM 162 corresponds to the non-transitory tangible storage medium in which the programs are stored. A method corresponding to the program is executed by executing the program. Here, a part or all of the functions to be executed by the CPU 161 may be configured as hardware circuitry by one or multiple ICs or the like. Alternatively, the number of the microcomputers constituting the control unit 151 may be one or more.

The communication unit 152 communicates with the upstream electric power distribution unit 102 connected to the communication line 141 by transmitting and receiving communication frames based on, for example, the Ethernet communication protocol. The Ethernet is a registered trademark.

The communication unit 153 communicates with the upstream electric power distribution unit 103 connected to the communication line 142 by transmitting and receiving communication frames based on, for example, the Ethernet communication protocol.

The communication unit 154 communicates with the zone ECU 104 connected to the communication line 143 by transmitting and receiving communication frames based on, for example, the Ethernet communication protocol.

The communication unit 155 communicates with the zone ECU 105 connected to the communication line 144 by transmitting and receiving communication frames based on, for example, the Ethernet communication protocol.

The communication unit 156 communicates with the zone ECU 106 connected to the communication line 145 by transmitting and receiving communication frames based on, for example, the Ethernet communication protocol.

The communication unit 157 communicates with the zone ECU 107 connected to the communication line 145 by transmitting and receiving communication frames based on, for example, the Ethernet communication protocol.

The memory unit 158 is a storage device for storing various data. The memory unit 158 stores an activation table 165 to be described later.

The upstream electric power distribution unit 102 includes a control circuit 171, a communication unit 172, and electronic fuses 173 and 174.

The control circuit 171 performs control to switch the electronic fuses 173 and 174 between an on state and an off state based on an instruction acquired from the central ECU 101 via the communication unit 172.

The communication unit 172 communicates with the central ECU 101 connected to the communication line 141 by transmitting and receiving communication frames based on, for example, the Ethernet communication protocol.

The electronic fuse 173 is disposed between the power supply path 121 and the power supply path 123. The electronic fuse 174 is disposed between the power supply path 121 and the power supply path 124.

The upstream electric power distribution unit 103 includes a control circuit 181, a communication unit 182, and electronic fuses 183 and 184.

The control circuit 181 performs control to switch the electronic fuses 183 and 184 between an on state and an off state based on an instruction acquired from the central ECU 101 via the communication unit 182.

The communication unit 182 communicates with the central ECU 101 connected to the communication line 142 by transmitting and receiving communication frames based on, for example, the Ethernet communication protocol.

The electronic fuse 183 is disposed between the power supply path 122 and the power supply path 125. The electronic fuse 184 is disposed between the power supply path 122 and the power supply path 126.

Figure 14:
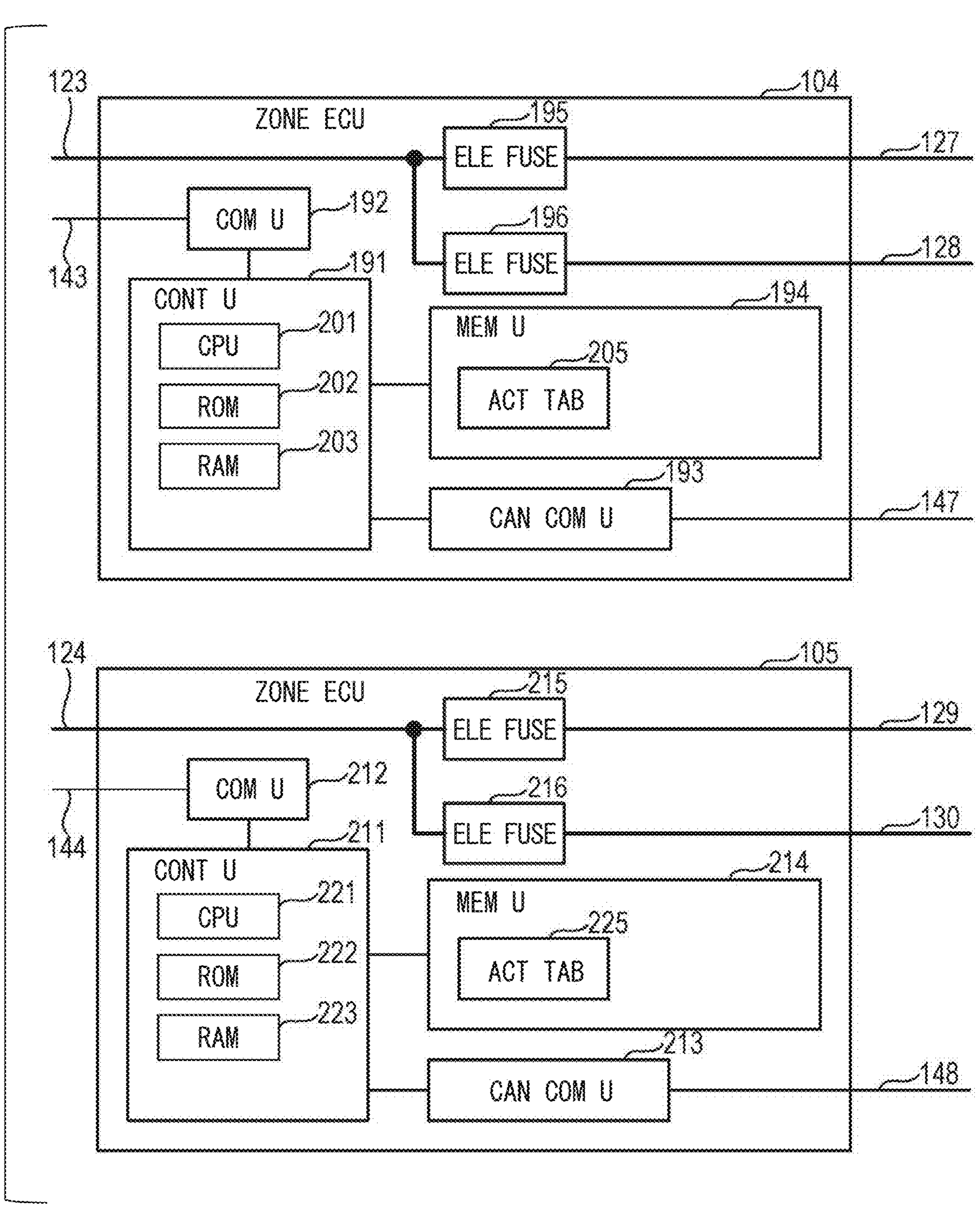
FIG. 14 is a second block diagram illustrating the configuration of the zone ECU according to the fourth embodiment.

As shown in FIG. 14, the zone ECU 104 includes a control unit 191, a communication unit 192, a CAN communication unit 193, a memory unit 194, and electronic fuses 195 and 196.

The control unit 191 is an electronic control device mainly including a microcomputer with a CPU 201, a ROM 202, a RAM 203, and the like. Various functions of the microcomputer are implemented by the CPU 201 executing programs stored in a non-transitory tangible storage medium. In this example, the ROM 202 corresponds to the non-transitory tangible storage medium in which the programs are stored. A method corresponding to the program is executed by executing the program. Here, a part or all of the functions to be executed by the CPU 201 may be configured as hardware circuitry by one or multiple ICs or the like. Alternatively, the number of the microcomputers constituting the control unit 191 may be one or more.

The communication unit 192 communicates with the central ECU 101 connected to the communication line 143 by transmitting and receiving communication frames based on, for example, the Ethernet communication protocol.

The CAN communication unit 193 communicates with the slave ECUs 108 and 109 connected to the communication bus 147 by transmitting and receiving a communication frame based on the CAN communication protocol.

The memory unit 194 is a storage device for storing various data. The memory unit 194 stores an activation table 205 to be described later.

The electronic fuse 195 is disposed between the power supply path 123 and the power supply path 127. The electronic fuse 196 is disposed between the power supply path 123 and the power supply path 128.

The zone ECU 105 includes a control unit 211, a communication unit 212, a CAN communication unit 213, a memory unit 214, and electronic fuses 215 and 216.

The control unit 211 is an electronic control device mainly including a microcomputer with a CPU 221, a ROM 222, a RAM 223, and the like. Various functions of the microcomputer are implemented by the CPU 221 executing programs stored in a non-transitory tangible storage medium. In this example, the ROM 222 corresponds to a non-transitory tangible storage medium storing programs. A method corresponding to the program is executed by executing the program. Here, a part or all of the functions to be executed by the CPU 221 may be configured as hardware circuitry by one or multiple ICs or the like. Alternatively, the number of the microcomputers constituting the control unit 211 may be one or more.

The communication unit 212 communicates with the central ECU 101 connected to the communication line 144 by transmitting and receiving communication frames based on, for example, the Ethernet communication protocol.

The CAN communication unit 213 communicates with the slave ECUs 110 and 111 connected to the communication bus 148 by transmitting and receiving a communication frame based on the CAN communication protocol.

The memory unit 214 is a storage device for storing various data. The memory unit 214 stores an activation table 225 to be described later.

The electronic fuse 215 is disposed between the power supply path 124 and the power supply path 129. The electronic fuse 216 is disposed between the power supply path 124 and the power supply path 130.

Figure 15:
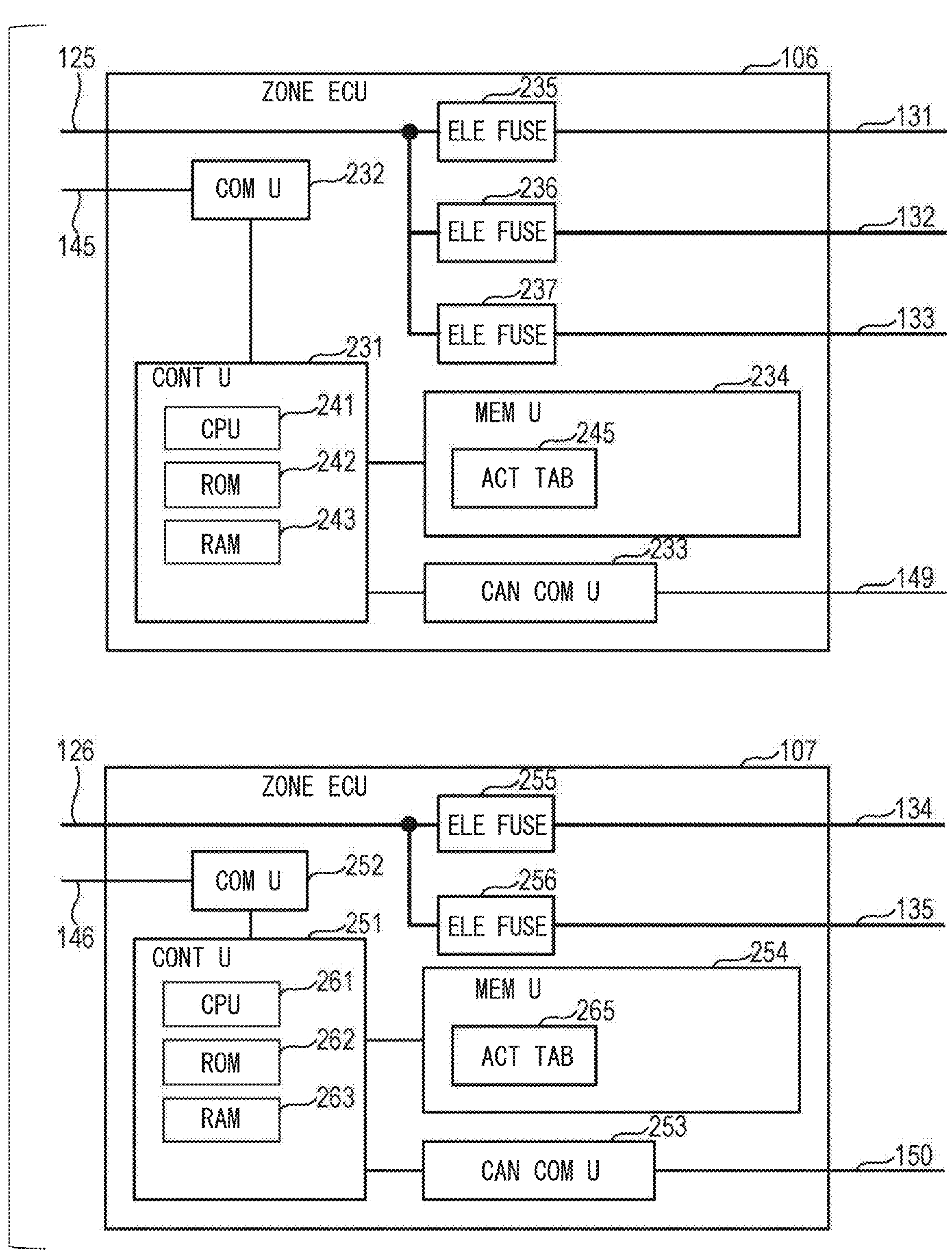
FIG. 15 is a second block diagram illustrating the configuration of the zone ECU according to the fourth embodiment.

As shown in FIG. 15, the zone ECU 106 includes a control unit 231, a communication unit 232, a CAN communication unit 233, a memory unit 234, and electronic fuses 235, 236 and 237.

The control unit 231 is an electronic control device mainly including a microcomputer with a CPU 241, a ROM 242, a RAM 243, and the like. Various functions of the microcomputer are implemented by the CPU 241 executing programs stored in a non-transitory tangible storage medium. In this example, the ROM 242 corresponds to the non-transitory tangible storage medium in which the programs are stored. A method corresponding to the program is executed by executing the program. Here, a part or all of the functions to be executed by the CPU 241 may be configured as hardware circuitry by one or multiple ICs or the like. Alternatively, the number of the microcomputers constituting the control unit 231 may be one or more.

The communication unit 232 communicates with the central ECU 101 connected to the communication line 145 by transmitting and receiving communication frames based on, for example, the Ethernet communication protocol.

The CAN communication unit 233 communicates with the slave ECUs 112, 113 and 114 connected to the communication bus 149 by transmitting and receiving a communication frame based on the CAN communication protocol.

The memory unit 234 is a storage device for storing various data. The memory unit 234 stores an activation table 245 to be described later.

The electronic fuse 235 is disposed between the power supply path 125 and the power supply path 131. The electronic fuse 236 is disposed between the power supply path 125 and the power supply path 132. The electronic fuse 237 is disposed between the power supply path 125 and the power supply path 133.

The zone ECU 107 includes a control unit 251, a communication unit 252, a CAN communication unit 253, a memory unit 254, and electronic fuses 255 and 256.

The control unit 251 is an electronic control device mainly including a microcomputer with a CPU 261, a ROM 262, a RAM 263, and the like. Various functions of the microcomputer are implemented by the CPU 261 executing programs stored in a non-transitory tangible storage medium. In this example, the ROM 262 corresponds to the non-transitory tangible storage medium in which the programs are stored. A method corresponding to the program is executed by executing the program. Here, a part or all of the functions to be executed by the CPU 261 may be configured as hardware circuitry by one or multiple ICs or the like. Alternatively, the number of the microcomputers constituting the control unit 251 may be one or more.

The communication unit 252 communicates with the central ECU 101 connected to the communication line 146 by transmitting and receiving communication frames based on, for example, the Ethernet communication protocol.

The CAN communication unit 253 communicates with the slave ECUs 115 and 116 connected to the communication bus 150 by transmitting and receiving a communication frame based on the CAN communication protocol.

The memory unit 254 is a storage device for storing various data. The memory unit 254 stores an activation table 265 to be described later.

The electronic fuse 255 is disposed between the power supply path 126 and the power supply path 134. The electronic fuse 256 is disposed between the power supply path 126 and the power supply path 135.

Figure 16:
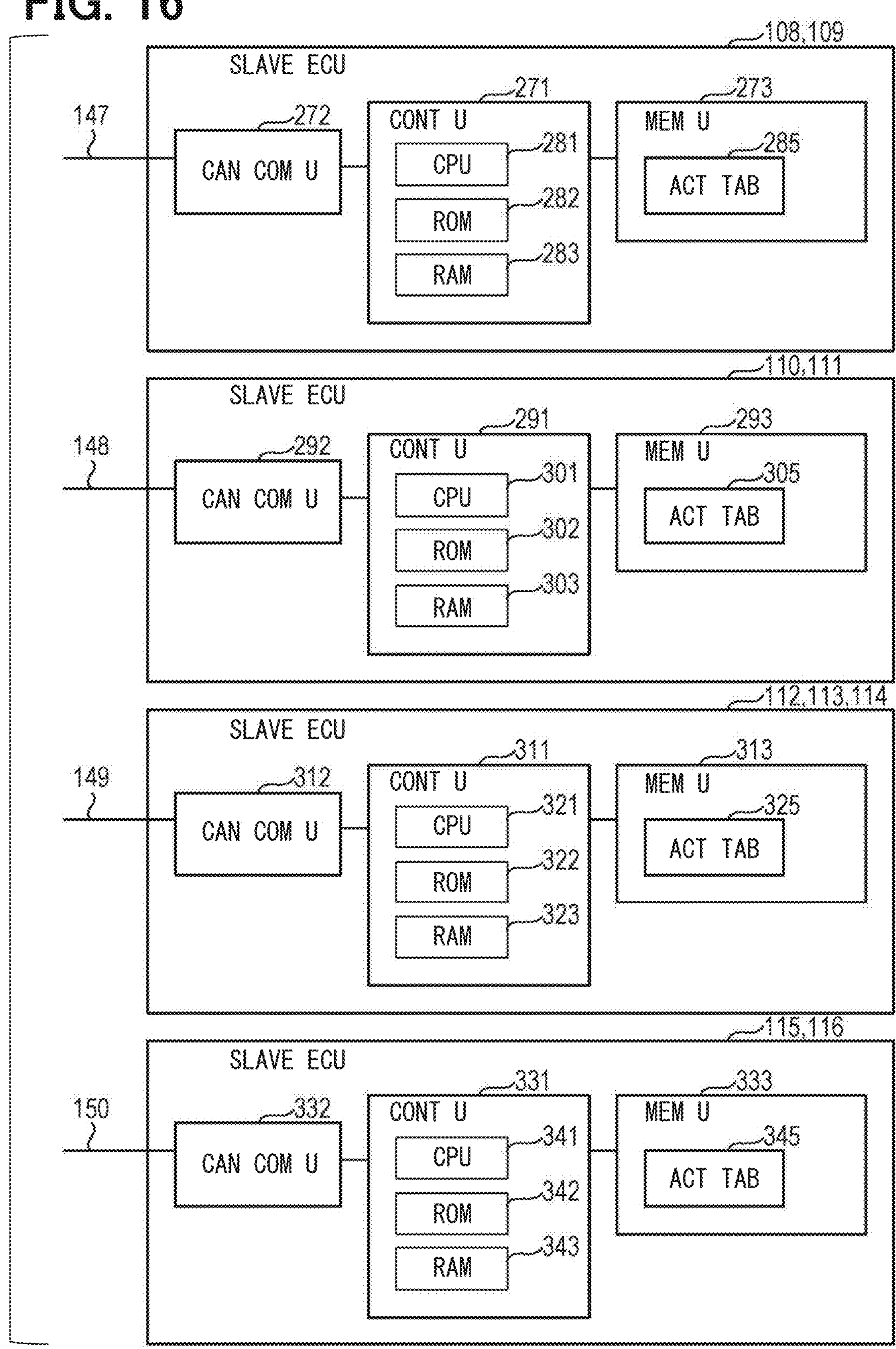
FIG. 16 is a block diagram illustrating a configuration of a slave ECU according to the fourth embodiment.

As shown in FIG. 16, the slave ECUs 108 and 109 each include a control unit 271, a CAN communication unit 272, and a memory unit 273.

The control unit 271 is an electronic control device mainly including a microcomputer with a CPU 281, a ROM 282, a RAM 283, and the like. Various functions of the microcomputer are implemented by the CPU 281 executing programs stored in a non-transitory tangible storage medium. In this example, the ROM 282 corresponds to the non-transitory tangible storage medium in which the programs are stored. A method corresponding to the program is executed by executing the program. Here, a part or all of the functions to be executed by the CPU 281 may be configured as hardware circuitry by one or multiple ICs or the like. Alternatively, the number of the microcomputers constituting the control unit 271 may be one or more.

The CAN communication unit 272 communicates with the zone ECU 104 connected to the communication bus 147 based on the CAN communication protocol.

The memory unit 273 is a storage device for storing various data. The memory unit 273 stores an activation table 285 to be described later.

The slave ECUs 110 and 111 include the control unit 291, the CAN communication unit 292, and the memory unit 293, respectively.

The control unit 291 is an electronic control device mainly including a microcomputer with a CPU 301, a ROM 302, a RAM 303, and the like. Various functions of the microcomputer are implemented by the CPU 301 executing programs stored in a non-transitory tangible storage medium. In this example, the ROM 302 corresponds to the non-transitory tangible storage medium in which the programs are stored. A method corresponding to the program is executed by executing the program. Here, a part or all of the functions to be executed by the CPU 301 may be configured as hardware circuitry by one or multiple ICs or the like. Alternatively, the number of the microcomputers constituting the control unit 291 may be one or more.

The CAN communication unit 292 communicates with the zone ECU 105 connected to the communication bus 148 based on the CAN communication protocol.

The memory unit 293 is a storage device for storing various data. The memory unit 293 stores an activation table 305 to be described later.

The slave ECUs 112, 113 and 114 each include the control unit 311, the CAN communication unit 312, and the memory unit 313, respectively.

The control unit 311 is an electronic control device mainly including a microcomputer with a CPU 321, a ROM 322, a RAM 323, and the like. Various functions of the microcomputer are implemented by the CPU 321 executing programs stored in a non-transitory tangible storage medium. In this example, the ROM 322 corresponds to the non-transitory tangible storage medium in which the programs are stored. A method corresponding to the program is executed by executing the program. Here, a part or all of the functions to be executed by the CPU 321 may be configured as hardware circuitry by one or multiple ICs or the like. Alternatively, the number of the microcomputers constituting the control unit 311 may be one or more.

The CAN communication unit 312 communicates with the zone ECU 106 connected to the communication bus 149 based on the CAN communication protocol.

The memory unit 313 is a storage device for storing various data. The memory unit 313 stores an activation table 325 to be described later.

The slave ECUs 115 and 116 include the control unit 331, the CAN communication unit 332, and the memory unit 333, respectively.

The control unit 331 is an electronic control device mainly including a microcomputer with a CPU 341, a ROM 342, a RAM 343, and the like. Various functions of the microcomputer are implemented by the CPU 341 executing programs stored in a non-transitory tangible storage medium. In this example, the ROM 342 corresponds to the non-transitory tangible storage medium in which the programs are stored. A method corresponding to the program is executed by executing the program. Here, a part or all of the functions to be executed by the CPU 341 may be configured as hardware circuitry by one or multiple ICs or the like. Alternatively, the number of the microcomputers constituting the control unit 331 may be one or more.

The CAN communication unit 332 communicates with the zone ECU 107 connected to the communication bus 150 based on the CAN communication protocol.

The memory unit 333 is a storage device for storing various data. The memory unit 333 stores an activation table 345 to be described later.

In the activation tables 165, 205, 225, 245, 265, 285, 305, 325, and 345, a communication group to be activated (that is, an activation group) is set for each event. The event also includes the power source state of the vehicle.

The activation table 165 of the central ECU 101 further sets a correspondence relationship between the activation group and the electronic fuses to be turned on among all of the electronic fuses 173, 174, 183, 184, 195, 196, 215, 216, 235, 236, 237, 255, and 256 provided in the communication system 100.

On the other hand, when the power source state of the vehicle is switched (at S10), the central ECU 101 specifies the conduction fuse and the cutoff fuse in the power source state after switching the power source state based on the activation table 165 (at S20).

The central ECU 101 then instructs the zone ECUs 104 to 107 to turn on the specified conduction fuses and turn off the specified cutoff fuses.

Based on an instruction from the central ECU 101, the zone ECUs 104 to 107 transmit the electric power pre-cutoff notification information and the electric power state notification information to the slave ECUs in their control before turning off the electronic fuses in their control (at S30). The electric power pre-cutoff notice information includes cutoff fuse specification information.

The slave ECUs 108 to 116 store the received electric power pre-cutoff notification information and the electric power source state notification information.

Based on an instruction from the central ECU 101, the zone ECUs 104 to 107 turn off the electronic fuses in their control after transmitting the electric power pre-cutoff notification information and the electric power state notification information to the slave ECUs in their control (at S40).

Furthermore, when an electronic fuse in the control of the zone ECUs 104 to 107 spontaneously switches to the off state (at S110), the zone ECUs 104 to 107 transmit the electric power post-cutoff notification information to the slave ECUs in the control of the zone ECUs (at S120). The electric power post-cutoff notice information includes cutoff fuse specification information.

The slave ECUs 108 to 116 store the received electric power post-cutoff notification information and the cutoff fuse specification information.

The communication system 100 configured in this manner includes a slave ECU 108, a slave ECU 109, a central ECU 101, and a zone ECU 104.

The slave ECU 108 receives an electric power supply from a battery 117 via an electronic fuse 195.

The slave ECU 109 is connected to the slave ECU 108 so as to be able to communicate data with each other.

The central ECU 101 and the zone ECU 104 are configured to execute switching control for switching the electronic fuse 195 between an on state and an off state.

The zone ECU 104 is configured to perform at least one of a pre-cutoff notification process and a post-cutoff notification process. In the pre-cutoff notification process, the electric power source pre-cutoff notification information is transmitted to the slave ECU 109 to notify that the electric power supply from the battery 117 via the electronic fuse 195 will be cut off before the electronic fuse 195 is turned off to cut off the electric power supply from the battery 117 to the slave ECU 108. In the post-cutoff notification process, the electric power source post-cutoff notification information is transmitted to the slave ECU 109 to notify that the electric power supply from the battery 117 via the electronic fuse 195 has been cut off after the electronic fuse 195 is turned off to cut off the electric power supply from the battery 117 to the slave ECU 108.

The slave ECU 109 is configured to store the received electric power pre-cutoff notification information and electric power post-cutoff notification information.

In such a communication system 100, when the central ECU 101 and the zone ECU 104 cut off the electric power supply to the slave ECU 108 due to the electronic fuse 195 being turned off, the central ECU 101 and the zone ECU 104 transmit at least one of the power source pre-cutoff notification information and the power source post-cutoff notification information to the slave ECU 109. In other words, the communication system 100 can determine whether or not the electronic fuse 195 has been in the off state based on whether or not the slave ECU 109 stores the power source pre-cutoff notification information and the power source post-cutoff notification information. Therefore, even if the slave ECU 109 detects an anomaly related to the slave ECU 108 caused by the electronic fuse 195 being turned off, the communication system 100 can determine that no anomaly has occurred in the slave ECU 108 when the slave ECU 109 stores the power source pre-cutoff notification information and the power source post-cutoff notification information. In other words, the communication system 100 can prevent the occurrence of a situation in which it is determined that an anomaly has occurred in the slave ECU 108 even if no anomaly has occurred in the slave ECU 108. Thereby, the communication system 100 can improve a detection accuracy of anomaly.

In the embodiment described above, the slave ECU 108 corresponds to the first control device, the battery 117 corresponds to the electric power source, the slave ECU 109 corresponds to the second control device, the central ECU 101 and the zone ECU 104 correspond to the switching control unit, and the zone ECU 104 corresponds to the electric power source cut-off notification unit.

Fifth Embodiment

Hereinafter, a fifth embodiment according to the present disclosure will be described with reference to the drawings.

In the fifth embodiment, portions different from those of the fourth embodiment will be described. The same reference numerals are given to the same configurations.

On the other hand, when the power source state of the vehicle is switched (at S10), the central ECU 101 specifies the conduction fuse and the cutoff fuse in the power source state after switching the power source state based on the activation table 165 (at S20).

The central ECU 101 transmits the electric power source pre-cutoff notification information and the electric power source state notification information to the slave ECUs 108 to 116 using the zone ECUs 104 to 107 as a relay device (at S30). The electric power pre-cutoff notice information includes cutoff fuse specification information.

The slave ECUs 108 to 116 store the received electric power pre-cutoff notification information and the electric power source state notification information.

The central ECU 101 then instructs the zone ECUs 104 to 107 to turn on the specified conduction fuses and turn off the specified cutoff fuses.

Based on an instruction from the central ECU 101, the zone ECUs 104 to 107 turn the electronic fuses in their control to be the on state or the off state (at S40).

Furthermore, when an electronic fuse in the control of the zone ECUs 104 to 107 spontaneously switches to the off state (at S110), the zone ECUs 104 to 107 transmit the electric power source post-cutoff notification information to the central ECU 101. The electric power post-cutoff notice information includes cutoff fuse specification information.

When the central ECU 101 receives the electric power source post-cutoff notification information from the zone ECUs 104 to 107, the central ECU 101 transmits the electric power source post-cutoff notification information to the slave ECUs 108 to 116 using the zone ECUs 104 to 107 as the relay devices (at S120).

The slave ECUs 108 to 116 store the received electric power post-cutoff notification information and the cutoff fuse specification information.

When the slave ECUs 108 to 116 store communication interruption diagnosis information of other nodes and store the electric power source pre-cutoff notification information or the electric power source post-cutoff notification information of other nodes, the slave ECUs 108 to 116 invalidate the communication interruption diagnosis information related to the other nodes.

In the communication system 100 configured in this manner, the central ECU 101 is configured to execute at least one of a pre-notification process and a post-notification process.

Such a communication system 100 can obtain the similar effects as the communication system 100 of the third embodiment.

In the embodiment described above, the central ECU 101 corresponds to an electric power source cutoff notification unit.

Although one embodiment of the present disclosure has been described above, the present disclosure is not limited to the above embodiment, and various modifications can be made.

(First Modification)

In the above embodiment, both the pre-cutoff notification process and the post-cutoff notification process are performed. Alternatively, it is also possible to perform either the pre-cutoff notification process and the post-cutoff notification process.

(Second Modification)

In the above embodiment, the slave ECUs 3 and 4 are connected to the master ECU 2 via the communication buses 6 and 7. Alternatively, the slave ECUs 3 and 4 may be directly connected to the master ECU 2 via wires. In addition, the slave ECU 4 may be connected to the master ECU 2 via the communication bus 6.

(Third Modification)

In the above embodiment, the driver of the vehicle performs an operation of depressing the power switch 8 while depressing the brake pedal of the vehicle, thereby starting the engine or the motor generator. Alternatively, the engine or the motor generator may be started when a person carrying the key or the smartphone approaches the vehicle.

(Fourth Modification)

In the above embodiment, the conduction fuse and the cutoff fuse are specified based on the power source state of the vehicle. Alternatively, the conduction fuse and the cutoff fuse may be specified based on whether the vehicle is travelling or a passenger in a vehicle. For example, if a user who possesses a smart key unlocks the door of the vehicle, it may be determined that the user is in the vehicle. Also, if the shift gear of the vehicle is in a "D" gear (i.e., a "drive" gear) and the vehicle speed is greater than 0 km/h, it may be determined that the vehicle is travelling.

Figure 9:
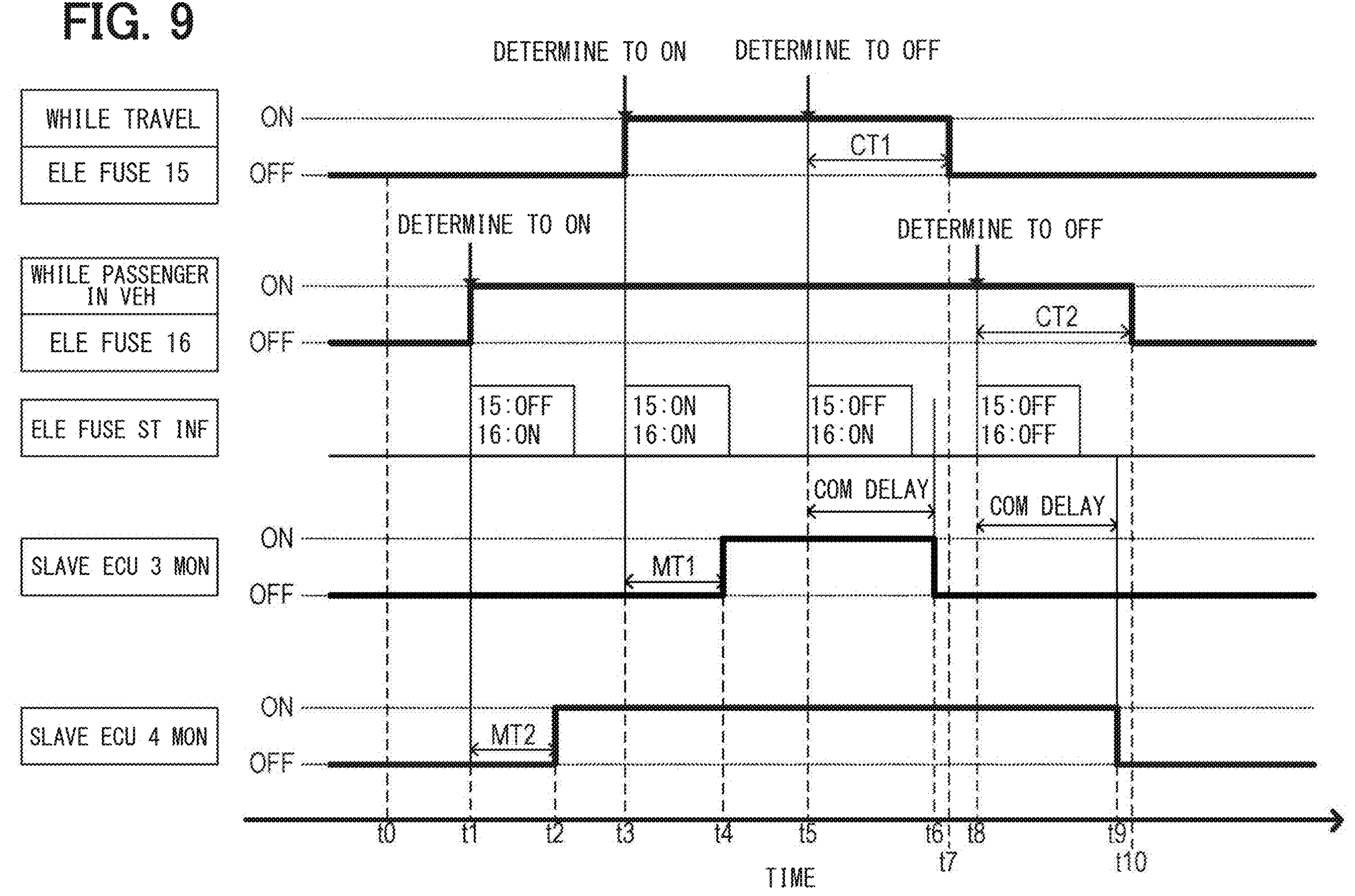
FIG. 9 is a timing chart showing a specific example of the start and the end of monitoring in another embodiment.

As shown in FIG. 9, at time to, since the vehicle is not travelling and the user is not in the vehicle, so the electronic fuses 15 and 16 are in the off state, and the slave ECU 9 is not monitoring the slave ECUs 3 and 4 for the communication interruption.

At time t1, the user of the vehicle is in vehicle, and the master ECU 2 turns on the electronic fuse 16. The master ECU 2 also transmits the fuse state information indicating that the electronic fuse 15 is a cutoff fuse and that the electronic fuse 16 is a conduction fuse.

The slave ECU 9 starts monitoring for a communication interruption of the slave ECU 4 at time t2 when the monitoring wait time MT2 has elapsed since receiving the fuse state information.

At time t3, the vehicle starts travelling, and the master ECU 2 turns the electronic fuse 15 on. The master ECU 2 also transmits the fuse state information indicating that the electronic fuses 15 and 16 are conduction fuses.

The slave ECU 9 starts monitoring for a communication interruption of the slave ECU 3 at time t4 when the monitoring wait time MT1 has elapsed since receiving the fuse state information.

At time t5, the vehicle is no longer travelling, and the master ECU 2 determines to turn off the electronic fuse 15. The master ECU 2 also transmits the fuse state information indicating that the electronic fuse 15 is a cutoff fuse and that the electronic fuse 16 is a conduction fuse.

When the slave ECU 9 receives the fuse state information at time t6, the slave ECU 9 stops monitoring the slave ECU 3 for the communication interruption.

The master ECU 2 turns off the electronic fuse 15 at time t7 when the cutoff waiting time CT1 has elapsed from time t5.

At time t8, the user of the vehicle is no longer in the vehicle, and the master ECU 2 determines to turn off the electronic fuse 16. The master ECU 2 also transmits the fuse state information indicating that the electronic fuses 15 and 16 are cutoff fuses.

When the slave ECU 9 receives the fuse state information at time t9, the slave ECU 9 stops monitoring the slave ECU 4 for the communication interruption.

The master ECU 2 turns off the electronic fuse 16 at time t10 when the cutoff waiting time CT2 has elapsed from time t8.

(Fifth Modification)

The above first embodiment provides the feature such that, when the communication interruption diagnosis information of another node is stored, and further when the electric power source pre-cutoff notification information or the electric power source post-cutoff notification information including the cut-off fuse specification information of an electronic fuse connected to the other node is stored, the communication interruption diagnosis information related to a slave ECU connected to an electronic fuse corresponding to the electric power source pre-cutoff notification information or the electric power source post-cutoff notification information is invalidated. Alternatively, even if a communication interruption with another node is detected, when the electric power source pre-cutoff notification information corresponding to the other node is stored, the communication interruption diagnosis information of the other node may not be stored.

In this way, when the communication interruption diagnosis information of another node is not stored, the invalidation may be terminated when a preset invalidation termination condition is met. The invalidation termination condition is, for example, receipt of an NM frame from another node, or receipt of on-state notification information indicating that an electronic fuse connected to another node has been turned on.

(Sixth Modification)

The first embodiment provides the feature such that the electric power source pre-cutoff notification information and the electric power source post-cutoff notification information are transmitted to the slave ECU connected to the conduction fuse. Alternatively, the electric power source pre-cutoff notification information and the electric power source post-cutoff notification information may be transmitted to all ECUs included in the communication system 1.

(Seventh Modification)

The above-described first embodiment provides the feature such that the master ECU 2 transmits the cutoff fuse specification information for specifying the cutoff fuse to the slave ECU. Alternatively, the master ECU 2 may transmit information for specifying the slave ECU connected to the cutoff fuse to the slave ECU instead of the cutoff fuse specification information. In this case, the master ECU 2 needs to be provided with a linking table that links the cutoff fuses with the slave ECUs connected to the cutoff fuses.

The control units 11, 31, 41 and 91 and methods thereof described in the present disclosure may be implemented by a dedicated computer including a processor and memory programmed to perform one or more functions embodied by a computer program. Alternatively, the control units 11, 31, 41 and 91 and the method thereof described in the present disclosure may be implemented by a dedicated computer including a processor implemented by one or more dedicated hardware logic circuits. Alternatively, the control units 11, 31, 41 and 91 and the methods thereof described in the present disclosure may be implemented by one or more dedicated computers implemented by a combination of a processor and memory programmed to execute one or more functions, and a processor implemented by one or more hardware logic circuits. The computer program may be stored in a computer-readable non-transitory tangible storage medium as instructions to be executed by a computer. The methods of implementing the function of each part included in the control units 11, 31, 41 and 91 do not necessarily include software, and all the functions may be implemented using one or more pieces of hardware.

Multiple functions belonging to one configuration element in the above-described embodiment may be implemented by multiple configuration elements, or one function belonging to one configuration element may be implemented by multiple configuration elements. Multiple functions of multiple configuration elements may be implemented by one configuration element, or one function implemented by multiple configuration elements may be implemented by one configuration element. A part of the configuration of the above embodiments may be omitted as appropriate. At least a part of the configuration of the above embodiment may be added to or replaced with the configuration of another embodiment.

In addition to the ECUs 2 to 4, 101, and 104-116 described above, various features such as a system including the ECUs 2 to 4, 101, and 104-116 as a component, a program for causing a computer to function as the ECUs 2 to 4, 101, and 104-116, a non-transitory tangible storage medium such as a semiconductor memory in which this program is stored, and a communication method can also provide the present embodiments.

Technical Features Disclosed in Present Embodiments (Feature 1)

A communication system includes:

a first control device provided by at least one of (i) a first circuit and (ii) a first processor having a first memory storing computer program code, the at least one of the first circuit and the first processor having the first memory configured to cause the first control device to receives electric power supply from a power source via an electronic fuse;

a second control device provided by at least one of (i) a second circuit and (ii) a second processor having a second memory storing computer program code and connected to the first control device, the at least one of the second circuit and the second processor having the second memory configured to cause the second control device to be capable of data communication;

a switching control unit provided by at least one of (i) a third circuit and (ii) a third processor having a third memory storing computer program code, the at least one of the third circuit and the third processor having the third memory configured to cause the switching control unit to execute switching control for switching the electronic fuse between an on state and an off state; and a power source cutoff notification unit provided by at least one of (i) a fourth circuit and (ii) a fourth processor having a fourth memory storing computer program code, the at least one of the fourth circuit and the fourth processor having the fourth memory configured to cause the power source cutoff notification unit to perform at least one of:

a pre-cutoff notification process of transmitting power source pre-cutoff notification information to the second control device notifying that the electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device.

The second control device is configured to store a received power source pre-cutoff notification information and a received power source post-cutoff notification information.

(Second Feature)

In the communication system according to feature 1, each of the power source pre-cutoff notification information and the power source post-cutoff notification information includes cutoff fuse specification information for specifying the electronic fuse to be turned off.

(Third Feature)

In the communication system according to feature 1 or 2, the second control device further includes an invalidation unit that is configured to invalidate communication interruption diagnosis information indicating that communication with the first control device has been interrupted when the second control device receives the power source pre-cutoff notification information or the power source post-cutoff notification information.

(Fourth Feature)

In the communication system according to any one of features 1 to 3, the power source cutoff notification unit is configured to transmit the power source pre-cutoff notification information before turning off the electronic fuse in response to a change in a power source state of a vehicle equipped with the communication system.

(Fifth Feature)

In the communication system according to any one of features 1 to 4, the power source cutoff notification unit is configured to transmit the power source post-cutoff notification information after the electronic fuse spontaneously turns off.

(Sixth Feature)

In the communication system according to feature 4, the power source cutoff notification unit is further configured to transmit power source state notification information indicating the power source state after the change in the power source state of the vehicle.

(Seventh Feature)

In the communication system according to feature 1, the power source cutoff notification unit is configured to perform the pre-cutoff notification process; and the switching control unit further includes a cutoff unit that is configured to turn off the electronic fuse after a predetermined cutoff waiting time has elapsed since the power source cutoff notification unit transmitted the power source pre-cutoff notification information.

(Eighth Feature)

In the communication system according to claim 7, the second control device further includes: a monitoring cancel unit (S420) that is configured to cancel monitoring of the first control device when the power source pre-cutoff notification information is received.

(Ninth Feature)

In the communication system according to feature 7 or 8, the switching control unit is configured to transmit power source conduction notification information when the electronic fuse is turned on, and the second control device is configured to start monitoring the first control device after a predetermined monitoring wait time has elapsed since receiving the power source conduction notification information.

(Tenth Feature)

A management device includes:

an electronic fuse control unit provided by at least one of (i) a first circuit and (ii) a first processor having a first memory storing computer program code, the at least one of the first circuit and the first processor having the first memory configured to cause the electronic fuse control unit to control an operation of an electronic fuse for switching between a conduction state in which a power supply path is conducted for supplying electric power from a power source to a first control device and a cutoff state in which the power supply path is cut off;

a communication unit provided by at least one of (i) a second circuit and (ii) a second processor having a second memory storing computer program code, the at least one of the second circuit and the second processor having the second memory configured to cause the communication unit to perform data communication with a second control device connected to the first control device so as to be able to perform data communication with the first control device; and a power source cutoff notification unit provided by at least one of (i) a third circuit and (ii) a third processor having a third memory storing computer program code, the at least one of the third circuit and the third processor having the third memory configured to cause the power source cutoff notification unit to perform at least one of:

a pre-cutoff notification process of transmitting power source pre-cutoff notification information to the second control device notifying that the electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device.

(Eleventh Feature)

In the management device according to feature 10, the power source cutoff notification unit is configured to perform the pre-cutoff notification process; and the management device further includes: a cutoff unit that is configured to turn off the electronic fuse after a predetermined cutoff waiting time has elapsed since the power source cutoff notification unit transmitted the power source pre-cutoff notification information.

(Twelfth Feature)

In the communication system according to feature 3, the invalidation unit is configured to invalidate the communication interruption diagnosis information by not storing the communication interruption diagnosis information even when a communication interruption with the first control device is detected and the power source pre-cutoff notification information corresponding to the first control device is stored.

(Thirteenth Feature)

In the communication system according to feature 12, the invalidation unit is configured to terminate the invalidation when a preset invalidation termination condition is met.

(Thirteenth Feature)

In the communication system according to feature 3, the invalidation unit is configured to invalidate the communication interruption diagnosis information by adding invalidation information indicating invalid to a stored communication interruption diagnosis information.

(Fifteenth Feature)

In the communication system according to any one of features 1 to 8 and 12 to 14, the power source cutoff notification unit is configured to transmit the power source pre-cutoff notification information and the power source post-cutoff notification information to all electronic control devices included in the communication system.

(Sixteenth Feature)

In the communication system according to any one of features 1 to 8 and 12 to 15, each of the power source pre-cutoff notification information and the power source post-cutoff notification information includes cutoff device specification information for specifying an electronic control device connected to the electronic fuse to be turned off.

(Seventeenth Feature)

In the communication system according to feature 16, the power source cut-off notification unit is configured to generate the cut-off device specification information by referring to a linking table that links the electronic fuse to be turned off and the electronic control device connected to the electronic fuse to be turned off.

(Eighteenth Feature)

In the communication system according to any one of features 1 to 8 and 12 to 17, the communication system further includes: the first control device and the second control device as slave control devices; a zone control device that is connected to the slave control devices so as to be able to perform data communication with the slave control devices; and a central control device that is connected to the zone control device so as to be able to perform data communication with the zone control devices. The zone control device includes the switching control unit and the power source cutoff notification unit.

(Nineteenth Feature)

In the communication system according to any one of features 1 to 8 and 12 to 17, the communication system further includes: the first control device and the second control device as slave control devices; a zone control device that is connected to the slave control devices so as to be able to perform data communication with the slave control devices; and a central control device that is connected to the zone control device so as to be able to perform data communication with the zone control devices. The central control device includes the power source cutoff notification unit, and the zone control device includes the switching control unit.

(Twentieth Feature)

A management program causes a computer to function as:

an electronic fuse control unit that is configured to control an operation of an electronic fuse for switching between a conduction state in which a power supply path is conducted for supplying electric power from a power source to a first control device and a cutoff state in which the power supply path is cut off;

a communication unit that is configured to perform data communication with a second control device connected to the first control device so as to be able to perform data communication with the first control device; and a power source cutoff notification unit that is configured to perform at least one of:

a pre-cutoff notification process of transmitting power source pre-cutoff notification information to the second control device notifying that the electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a communication system to perform functions" should be understood that (i) only the circuit can cause a communication system to perform all the functions, (ii) only the processor can cause a communication system to perform all the functions, or (iii) the circuit can cause a communication system to perform at least one of the functions and the processor can cause a communication system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:

a first control device that receives electric power supply from a power source via an electronic fuse;

a second control device that is connected to the first control device so as to be capable of data communication;

a switching control unit that is configured to execute switching control for switching the electronic fuse between an on state and an off state; and a power source cutoff notification unit that is configured to perform at least one of:

a pre-cutoff notification process of transmitting power source pre-cutoff notification information to the second control device notifying that the electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device, wherein:

the second control device is configured to store a received power source pre-cutoff notification information and a received power source post-cutoff notification information.

2. The communication system according to claim 1, wherein:

each of the power source pre-cutoff notification information and the power source post-cutoff notification information includes cutoff fuse specification information for specifying the electronic fuse to be turned off.

3. The communication system according to claim 1, wherein:

the second control device further includes an invalidation unit that is configured to invalidate communication interruption diagnosis information indicating that communication with the first control device has been interrupted when the second control device receives the power source pre-cutoff notification information or the power source post-cutoff notification information.

4. The communication system according to claim 1, wherein:

the power source cutoff notification unit is configured to transmit the power source pre-cutoff notification information before turning off the electronic fuse in response to a change in a power source state of a vehicle equipped with the communication system.

5. The communication system according to claim 1, wherein:

the power source cutoff notification unit is configured to transmit the power source post-cutoff notification information after the electronic fuse spontaneously turns off.

6. The communication system according to claim 4, wherein:

the power source cutoff notification unit is further configured to transmit power source state notification information indicating the power source state after the change in the power source state of the vehicle.

7. The communication system according to claim 1, wherein:

the power source cutoff notification unit is configured to perform the pre-cutoff notification process; and the switching control unit further includes a cutoff unit that is configured to turn off the electronic fuse after a predetermined cutoff waiting time has elapsed since the power source cutoff notification unit transmitted the power source pre-cutoff notification information.

8. The communication system according to claim 7, wherein:

the second control device further includes: a monitoring cancel unit that is configured to cancel monitoring of the first control device when the power source pre-cutoff notification information is received.

9. The communication system according to claim 7, wherein:

the switching control unit is configured to transmit power source conduction notification information when the electronic fuse is turned on; and the second control device is configured to start monitoring the first control device after a predetermined monitoring waiting time has elapsed since receiving the power source conduction notification information.

10. The communication system according to claim 3, wherein:

the invalidation unit is configured to invalidate the communication interruption diagnosis information by not storing the communication interruption diagnosis information even when a communication interruption with the first control device is detected and the power source pre-cutoff notification information corresponding to the first control device is stored.

11. The communication system according to claim 10, wherein:

the invalidation unit is configured to terminate the invalidation when a preset invalidation termination condition is met.

12. The communication system according to claim 3, wherein:

the invalidation unit is configured to invalidate the communication interruption diagnosis information by adding invalidation information indicating invalid to a stored communication interruption diagnosis information.

13. The communication system according to claim 1, wherein:

the power source cutoff notification unit is configured to transmit the power source pre-cutoff notification information and the power source post-cutoff notification information to all electronic control devices included in the communication system.

14. The communication system according to claim 1, wherein:

each of the power source pre-cutoff notification information and the power source post-cutoff notification information includes cutoff device specification information for specifying an electronic control device connected to the electronic fuse to be turned off.

15. The communication system according to claim 14, wherein:

the power source cutoff notification unit is configured to generate the cut-off device specification information by referring to a linking table that links the electronic fuse to be turned off and the electronic control device connected to the electronic fuse to be turned off.

16. The communication system according to claim 1, wherein:

the first control device and the second control device are included as slave control devices, the communication system further comprising:

a zone control device that is connected to the slave control devices so as to be able to perform data communication with the slave control devices; and a central control device that is connected to the zone control device so as to be able to perform data communication with the zone control device, wherein:

the zone control device includes the switching control unit and the power source cutoff notification unit.

17. The communication system according to claim 1, wherein:

the first control device and the second control device are included as slave control devices, the communication system further comprising:

a zone control device that is connected to the slave control devices so as to be able to perform data communication with the slave control devices; and a central control device that is connected to the zone control device so as to be able to perform data communication with the zone control device, wherein:

the central control device includes the power source cutoff notification unit; and the zone control device includes the switching control unit.

18. The communication system according to claim 1, further comprising:

at least one of (i) a first circuit and (ii) a first processor having a first memory storing computer program code;

the at least one of the first circuit and the first processor having the first memory is configured to cause the communication system to provide at least one of: the first control device; the second control device; the switching control unit; and the power source cutoff notification unit.

19. A management device includes:

an electronic fuse control unit that is configured to control an operation of an electronic fuse for switching between a conduction state in which a power supply path is conducted for supplying electric power from a power source to a first control device and a cutoff state in which the power supply path is cut off;

a communication unit that is configured to perform data communication with a second control device connected to the first control device so as to be able to perform data communication with the first control device; and a power source cutoff notification unit that is configured to perform at least one of:

a pre-cutoff notification process of transmitting power source pre-cutoff notification information to the second control device notifying that electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device.

20. The management device according to claim 19, wherein:

the power source cutoff notification unit is configured to perform the pre-cutoff notification process; and the management device further includes: a cutoff unit that is configured to turn off the electronic fuse after a predetermined cutoff waiting time has elapsed since the power source cutoff notification unit transmitted the power source pre-cutoff notification information.

21. The management device according to claim 19, further comprising:

at least one of (i) a first circuit and (ii) a first processor having a first memory storing computer program code;

the at least one of the first circuit and the first processor having the first memory is configured to cause the management device to provide at least one of: the electronic fuse control unit; the communication unit; and the power source cutoff notification unit.

22. A non-transitory computer readable storage medium comprising instructions being executed by a computer, the instructions causing the computer to function as:

an electronic fuse control unit that is configured to control an operation of an electronic fuse for switching between a conduction state in which a power supply path is conducted for supplying electric power from a power source to a first control device and a cutoff state in which the power supply path is cut off;

a communication unit that is configured to perform data communication with a second control device connected to the first control device so as to be able to perform data communication with the first control device; and a power source cutoff notification unit that is configured to perform at least one of:

a pre-cutoff notification process of transmitting power source pre-cutoff notification information to the second control device notifying that electric power supply from the power source via the electronic fuse will be cut off before turning off the electronic fuse to cut off the electric power supply from the power source to the first control device; and a post-cutoff notification process of transmitting power source post-cutoff notification information to the second control device notifying that the electric power supply from the power source via the electronic fuse has been cut off after the electronic fuse has been turned off to cut off the electric power supply from the power source to the first control device.

* * * * *